United States Patent
Rosewarne et al.

(10) Patent No.: US 11,172,231 B2
(45) Date of Patent: Nov. 9, 2021

(54) METHOD, APPARATUS AND SYSTEM FOR ENCODING OR DECODING VIDEO DATA OF PRECINCTS BY USING WAVELET TRANSFORM

(71) Applicant: CANON KABUSHIKI KAISHA, Tokyo (JP)

(72) Inventors: Christopher James Rosewarne, Concord West (AU); Andrew James Dorrell, Glenbrook (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/628,231

(22) PCT Filed: Jul. 3, 2018

(86) PCT No.: PCT/AU2018/000112
§ 371 (c)(1),
(2) Date: Jan. 2, 2020

(87) PCT Pub. No.: WO2019/006488
PCT Pub. Date: Jan. 10, 2019

(65) Prior Publication Data
US 2020/0128274 A1 Apr. 23, 2020

(30) Foreign Application Priority Data
Jul. 7, 2017 (AU) .............................. 2017204643

(51) Int. Cl.
*H04N 19/645* (2014.01)
*H04N 21/234* (2011.01)
(Continued)

(52) U.S. Cl.
CPC ......... *H04N 19/645* (2014.11); *H04N 19/124* (2014.11); *H04N 21/234* (2013.01); *H04N 21/236* (2013.01)

(58) Field of Classification Search
CPC .. H04N 19/645; H04N 19/124; H04N 21/234; H04N 21/236; H04N 19/146; H04N 19/174
(Continued)

(56) References Cited

U.S. PATENT DOCUMENTS

| 7,882,117 B1 | 2/2011 | Hyde et al. |
| 8,514,188 B2 | 8/2013 | Hoover et al. |

(Continued)

FOREIGN PATENT DOCUMENTS

| CN | 1711552 A | 12/2005 |
| CN | 102484708 A | 5/2012 |
| CN | 105637869 A | 6/2016 |

OTHER PUBLICATIONS

Yeung, Y. M. et al., Efficient Rate Control Technique for JPEG2000 Image Coding Using Priority Scanning, IEEE Transactions on Circuits and Systems for Video Technology, 2003, pp. 277-280.

(Continued)

*Primary Examiner* — Susan E. Hodges
(74) *Attorney, Agent, or Firm* — Canon U.S.A., Inc. IP Division

(57) ABSTRACT

A method of encoding video data into a video bitstream having a plurality of precincts. The method comprises generating a plurality of coding cost estimates for a current precinct by testing a corresponding candidate coefficient truncation level for the current precinct, each of the coding cost estimates being an over estimate of an encoded data size for coding the current precinct at the candidate truncation level and being determined using a most significant bit plane index, wherein each of the coding cost estimates is independent of a value of coefficient bits in the current precinct. The method includes selecting one of the candidate truncation levels according to the corresponding coding cost estimate and a budgeted coding cost for the current precinct, (Continued)

the budgeted coding cost representing an allowable size of encoding the precinct; and encoding the current precinct of video data into the video bitstream to generate the video bitstream.

18 Claims, 14 Drawing Sheets

(51) Int. Cl.
*H04N 19/124* (2014.01)
*H04N 21/236* (2011.01)

(58) Field of Classification Search
USPC .............................. 375/240.19, 240; 275/240
See application file for complete search history.

(56) References Cited

U.S. PATENT DOCUMENTS

| | | | |
|---|---|---|---|
| 9,324,179 | B2 | 4/2016 | Wooley et al. |
| 9,332,258 | B2 | 5/2016 | Pellegrin et al. |
| 2003/0174897 | A1 | 9/2003 | Le Leannec et al. |
| 2003/0198391 | A1* | 10/2003 | Fukuhara ............ H04N 19/119 382/232 |
| 2004/0051709 | A1 | 3/2004 | Ogawa et al. |
| 2004/0264785 | A1 | 12/2004 | Suino et al. |
| 2006/0222254 | A1 | 10/2006 | Zandi et al. |
| 2007/0109296 | A1 | 5/2007 | Sakagawa et al. |
| 2007/0110163 | A1 | 5/2007 | Kodama |
| 2008/0070684 | A1 | 3/2008 | Haigh-Hutchinson |
| 2010/0045666 | A1 | 2/2010 | Kornmann et al. |
| 2010/0283742 | A1 | 11/2010 | Lam |
| 2010/0302239 | A1 | 12/2010 | Tokita et al. |
| 2011/0134998 | A1 | 6/2011 | Lee et al. |
| 2015/0169076 | A1 | 6/2015 | Cohen et al. |

OTHER PUBLICATIONS

Yeung, Y. M. et al., Efficient Rate Control for JPEG2000 Image Coding, IEEE Transactions on Circuits and Systems For Video Technology, Mar. 2005, pp. 335-344, vol. 15, No. 3.

Text of ISO/IEC 21122 WD (JPEG XS) v2.8, Coding of Still Pictures, Joint Picture Expert Group or ISO/IEC JTC1/SC29/WG1, JPEG Meeting; Mar. 26-31, 2017, Sydney, AU, Doc. No. M75019, Jun. 19, 2017, 62 pages, XP030190371, URL: https://www.iso.org.

Ren Jun-Ling, Predictive Coding Information Hiding Algorithm with Large Capacity Based on Image Separation, Journal of Beijing Information Science and Technology University, Feb. 2011, vol. 26, No. 1, 5 pages.

* cited by examiner

METHOD, APPARATUS AND SYSTEM FOR ENCODING OR DECODING VIDEO DATA OF PRECINCTS BY USING WAVELET TRANSFORM

TECHNICAL FIELD

The present invention relates generally to digital video signal processing and, in particular, to a method, apparatus and system for encoding and decoding video data. The present invention also relates to a computer program product including a computer readable medium having recorded thereon a computer program for encoding and decoding video data.

BACKGROUND

Many applications for video coding currently exist, including applications for transmission and storage of video data. Many video coding standards have also been developed and others are currently in development. Much emphasis in video compression research is directed towards 'distribution codecs' (i.e. codecs intended for distributing compressed video data to geographically dispersed audiences). However, an emerging area of research is directed towards 'mezzanine codecs'. Mezzanine codecs are used for highly localised distribution, i.e. within a broadcast studio. Mezzanine codecs are characterised by requirements for ultra-low latency, typically well under one frame, and greatly reduced complexity, both for the encoder and the decoder, compared to conventional video codecs. Recent developments in such coding within the International Organisations for Standardisation/International Electrotechnical Commission Joint Technical Committee 1/Subcommittee 29/Working Group 1 (ISO/IEC JTCI/SC29/WG1), also known as the Joint Photographic Experts Group (JPEG) have resulted in a standardisation work item named 'JPEG XS'. The goal of the JPEG XS work item is to produce a codec having an end-to-end latency not exceeding 32 lines of video data, and the capability for implementation within relatively modest implementation technologies, e.g. midrange FPGAs from vendors such as Xilinx®. Such latency requirements mandate the use of strict rate control techniques to ensure coded data does not vary excessively relative to the capacity of the channel carrying the compressed video data.

Conventional video codecs, such as H.264/AVC, tend to be used such that a video bitstream produced by one encoder is likely to be decoded many times (e.g. as is the case in broadcast television). In such applications, an encoder that is relatively more complex compared to the decoder is permissible. This asymmetry in complexity affords the possibility to test many different prediction modes prior to selecting an optimal prediction mode. In contrast, the application for a mezzanine codec typically involves one encoder producing a bitstream to be consumed by one decoder. As such, the allowable asymmetry in complexity between the encoder and decoder is greatly reduced.

In a broadcast studio, video may be captured by a camera before undergoing several transformations, including real-time editing, graphic and overlay insertion and mixing different content sources, resulting in the production of an output video stream. Once the video has been adequately processed, a distribution encoder is used to encode the output video stream for distribution to end consumers (e.g. via terrestrial broadcast). Within the studio, video data has traditionally generally been transported in an uncompressed format necessitating the use of very high speed links. Variants of the Serial Digital Interface (SDI) protocol can transport different video formats. For example, 3G-SDI (operating with a 3 Gbps electrical link) can transport 1080p HDTV (1920×1080 resolution) at 30 fps and eight (8) bits per sample. Interfaces having a fixed bit rate are suited to transporting data having a constant bit rate (CBR). Uncompressed video data is generally CBR, and compressed video data, in the context of ultra-low latency coding, is generally expected to also be CBR. The maximum usable cable length for signal propagation is reduced at higher bitrates, which can become problematic for cable routing through a studio. For example, UHDTV (3840×2160) requires a 4× increase in bandwidth compared to 1080p HDTV, implying a 12 Gbps interface. Increasing the data rate of a single electrical channel reduces the achievable length of the cabling. At 3 Gbps, cable runs generally cannot exceed 150 m, the minimum usable length for many studio applications. One method of achieving higher rate links is by replicating cabling, e.g. by using four 3G-SDI links, with frame tiling or some other multiplexing scheme. However, the cabling replicating method increases cable routing complexity, requires more physical space, and may reduce reliability compared to use of a single cable. Thus, a mezzanine codec that can perform compression at relatively low compression ratios (e.g. 4:1) while retaining a 'visually lossless' (i.e. having no perceivable artefacts compared to the original video data) level of performance is required by industry. Compression ratios may also be expressed as the number of 'bits per pixel' (bpp) afforded to the compressed stream, noting that conversion back to a compression ratio requires knowledge of the bit depth of the uncompressed signal, and the chroma format. For example, 8b 4:4:4 video data occupies 24 bpp when uncompressed, so transport at 4 bpp implies a 6:1 compression ratio.

Video data includes one or more colour channels. Generally there is one primary colour channel and two secondary colour channels. The primary colour channel is generally referred to as the 'luma' channel and the secondary colour channel(s) are generally referred to as the 'chroma' channels. Video data is represented using a colour space, such as 'YCbCr' or 'RGB'. Some applications require visually lossless compression of the output of a computer graphics card, or transmission from a SOC in a tablet to the LCD panel in the tablet. Such content often has different statistical properties from content captured from a camera, due to the use of rendering widgets, text, icons etc. Such applications can be referred to as 'screen content applications'. For screen content applications, an 'RGB' colour space is commonly used, as generally video is both captured and displayed as RGB, e.g. when driving an LCD panel. Note that the greatest signal strength is present in the 'G' (green) channel, so generally the G channel is coded using the primary colour channel, and the remaining channels (i.e. 'B' and 'R') are coded using the secondary colour channels. This arrangement may be referred to as 'GBR'. When the 'YCbCr' colour space is in use, the 'Y' channel is coded using the primary colour channel and the 'Cb' and 'Cr' channels are coded using the secondary colour channels.

Video data is also represented using a particular chroma format. The primary colour channel and the secondary colour channels are spatially sampled at the same spatial density when the 4:4:4 chroma format is in use. For screen content, the commonly used chroma format is 4:4:4, as generally LCD panels provide independent control of red, green and blue for each pixels, i.e. a 4:4:4 chroma format. The bit-depth defines the bit width of samples in the respective colour channel, which implies a range of available sample values. Generally, all colour channels have the same bit-depth, although they may alternatively have different bit-depths. Other chroma formats are also possible. For example, if the chroma channels are sampled at half the rate horizontally (compared to the luma channel), a 4:2:2 chroma format is said to be in use. Also, if the chroma channels are sampled at half the rate horizontally and vertically (compared to the luma channel), a 4:2:0 chroma format is said to be in use. These chroma formats exploit a characteristic of the human visual system that sensitivity to intensity is higher than sensitivity to colour. As such, it is possible to reduce sampling of the colour channels without causing undue visual impact. However, this property is less applicable to studio environments, where multiple generations of encoding and decoding are common. Also, for screen content the use of chroma formats other than 4:4:4 can be problematic as distortion is introduced to sub-pixel rendered (or 'anti-aliased') text and sharp object edges.

Frame data may also contain a mixture of screen content and camera captured content. For example, a computer screen may include various windows, icons and control buttons, text, and also contain a video being played, or an image being viewed. Such content, in terms of the entirety of a computer screen, can be referred to as 'mixed content'. Moreover, the level of detail (or 'texture') varies within a frame. Generally, regions of detailed textures (e.g. foliage, text), or regions containing noise (e.g. from a camera sensor) are difficult to compress. The detailed textures can only be coded at a low compression ratio without losing detail. Conversely, regions with little detail (e.g. flat regions, sky, background from a computer application) can be coded with a high compression ratio, with little loss of detail.

In the interests of low complexity, one method is application of the 'Wavelet' transform, applied hierarchically across the image. Wavelet transforms have been studied in the context of the JPEG2000 image coding standard. Application of a transfer across an image differs from a block-based codec, such as H.264/AVC, which applies numerous discrete cosine transforms (DCTs), each applied to small sections of each frame. Each block in H.264/AVC is predicted using one of a variety of methods, which achieves a high degree of local adaptivity, at the price of increased encoder complexity due to the need for mode decisions to be made. Moreover, the encoder uses a distortion calculation to assist in mode selection. In contrast, the Wavelet transform is applied over a wide spatial area, and thus the prediction modes available to a block based codec are generally not applicable, resulting in a greatly reduced disparity in the complexity of the encoder and the decoder. The absence of prediction mode decisions also avoids the need for a distortion measurement to assist in such decisions, reducing encoder complexity. However, decisions with regard to quantisation remain. In the context of wavelet-based compression techniques for mezzanine coding applications, further reduction in the encoder complexity is desired.

SUMMARY

It is an object of the present invention to substantially overcome, or at least ameliorate, one or more disadvantages of existing arrangements.

One aspect of the present disclosure provides a method of decoding an image frame from a bit-stream, the method comprising:

receiving a plurality of portions of a precinct of the image frame from the bit-stream, the precinct being encoded using a wavelet transform across the precinct and being arranged in the bit-stream in a plurality of columns corresponding to spatial columns of the precinct;

decoding coefficients from the received plurality of portions, each of the plurality of portions having inverse quantisation of the coefficients independent of inverse quantisation of other portions of the plurality of portions, the inverse quantisation being signalled as a scenario and refinement applicable to all subbands of the wavelet transform, wherein a scenario and refinement of an additional bitplane is signalled to at least one subband of the wavelet transform according to a bit budget for the column wherein the scenario and refinement indicates a truncation level; and forming the image frame using the decoded coefficients.

In some aspects, the bit budget for the column is determined from a budgeted coding cost for the current precinct being divided amongst the columns in the current precinct according to relative proportion that each of the columns occupies within the current precinct.

In some aspects, the precinct width is a multiple of 128, has a deepest level of 5 horizontal decomposition of 5, and a grouping of coefficients into sets of four at the deepest level.

Another aspect of the present disclosure provides an apparatus for decoding an image frame from a bit-stream, the apparatus comprising:

means for receiving a plurality of portions of a precinct of the image frame from the bit-stream, the precinct being encoded using a wavelet transform across the precinct and being arranged in the bit-stream in a plurality of columns corresponding to spatial columns of the precinct;

means for decoding coefficients from the received plurality of portions, each of the plurality of portions having inverse quantisation of the coefficients independent of inverse quantisation of other portions of the plurality of portions, the inverse quantisation being signalled as a scenario and refinement applicable to all subbands of the wavelet transform, wherein a scenario and refinement of an additional bitplane is signalled to at least one subband of the wavelet transform according to a bit budget for the column wherein the scenario and refinement indicates a truncation level; and means for forming the image frame using the decoded coefficients.

Another aspect of the present disclosure provides a system for decoding an image frame from a bit-stream, the system comprising:

a memory for storing data and a computer program;

a processor coupled to the memory for executing the computer program, the computer program including instructions for:

receiving a plurality of portions of a precinct of the image frame from the bit-stream, the precinct being encoded using a wavelet transform across the precinct and being arranged in the bit-stream in a plurality of columns corresponding to spatial columns of the precinct;

decoding coefficients from the received plurality of portions, each of the plurality of portions having inverse quantisation of the coefficients independent of inverse quantisation of other portions of the plurality of portions, the inverse quantisation being signalled as a scenario and refinement applicable to all subbands of the wavelet transform, wherein a scenario and refinement of an additional bitplane is signalled to at least one subband of the wavelet transform according to a bit budget for the column wherein the scenario and refinement indicates a truncation level; and forming the image frame using the decoded coefficients.

Another aspect of the present disclosure provides a non-transitory computer readable medium having a computer program stored on the medium for decoding an image frame from a bit-stream, the program comprising:

code for receiving a plurality of portions of a precinct of the image frame from the bit-stream, the precinct being encoded using a wavelet transform across the precinct and being arranged in the bit-stream in a plurality of columns corresponding to spatial columns of the precinct;

code for decoding coefficients from the received plurality of portions, each of the plurality of portions having inverse quantisation of the coefficients independent of inverse quantisation of other portions of the plurality of portions, the inverse quantisation being signalled as a scenario and refinement applicable to all subbands of the wavelet transform, wherein a scenario and refinement of an additional bitplane is signalled to at least one subband of the wavelet transform according to a bit budget for the column wherein the scenario and refinement indicates a truncation level; and code for forming the image frame using the decoded coefficients.

Another aspect of the present disclosure provides a method of encoding an image frame in to a bit-stream, the method comprising:

determining a plurality of portions of a precinct of the image frame, the precinct being encoded using a wavelet transform across the precinct and being arranged in a plurality of columns corresponding to spatial columns of the precinct;

determining coefficients from the plurality of portions, each of the plurality of portions having quantisation of the coefficients independent of quantisation of other portions of the plurality of portions, the quantisation being signalled as a scenario and refinement applicable to all subbands of the wavelet transform, wherein a scenario and refinement of an additional bitplane is determined for at least one subband of the wavelet transform according to a bit budget for the column wherein the scenario and refinement indicates a truncation level; and forming the bit-stream of the image frame using the determined coefficients.

Another aspect of the present disclosure provides an apparatus for encoding an image frame in to a bit-stream, the apparatus comprising:

means for determining a plurality of portions of a precinct of the image frame, the precinct being encoded using a wavelet transform across the precinct and being arranged in a plurality of columns corresponding to spatial columns of the precinct;

means for determining coefficients from the plurality of portions, each of the plurality of portions having quantisation of the coefficients independent of quantisation of other portions of the plurality of portions, the quantisation being signalled as a scenario and refinement applicable to all subbands of the wavelet transform, wherein a scenario and refinement of an additional bitplane is determined for at least one subband of the wavelet transform according to a bit budget for the column wherein the scenario and refinement indicates a truncation level; and means for forming the bit-stream of the image frame using the determined coefficients.

Another aspect of the present disclosure provides a system for encoding an image frame in to a bit-stream, the system comprising:

a memory for storing data and a computer program;

a processor coupled to the memory for executing the computer program, the computer program including instructions for:

determining a plurality of portions of a precinct of the image frame, the precinct being encoded using a wavelet transform across the precinct and being arranged in a plurality of columns corresponding to spatial columns of the precinct;

determining coefficients from the plurality of portions, each of the plurality of portions having quantisation of the coefficients independent of quantisation of other portions of the plurality of portions, the quantisation being signalled as a scenario and refinement applicable to all subbands of the wavelet transform, wherein a scenario and refinement of an additional bitplane is determined for at least one subband of the wavelet transform according to a bit budget for the column wherein the scenario and refinement indicates a truncation level; and forming the bit-stream of the image frame using the determined coefficients.

Another aspect of the present disclosure provides a non-transitory computer readable medium having a computer program stored on the medium for encoding an image frame in to a bit-stream, the program comprising:

code for determining a plurality of portions of a precinct of the image frame, the precinct being encoded using a wavelet transform across the precinct and being arranged in a plurality of columns corresponding to spatial columns of the precinct;

code for determining coefficients from the plurality of portions, each of the plurality of portions having quantisation of the coefficients independent of quantisation of other portions of the plurality of portions, the quantisation being signalled as a scenario and refinement applicable to all subbands of the wavelet transform, wherein a scenario and refinement of an additional bitplane is determined for at least one subband of the wavelet transform according to a bit budget for the column wherein the scenario and refinement indicates a truncation level; and code for forming the bit-stream of the image frame using the determined coefficients.

Another aspect of the present disclosure provides a method of encoding video data into a video bitstream having a plurality of precincts, the method comprising: generating a plurality of coding cost estimates for a current precinct of the plurality of precincts by testing a corresponding candidate coefficient truncation level for the current precinct, each of the coding cost estimates being an over estimate of an encoded data size for coding the current precinct at the candidate truncation level and being determined using a most significant bit plane index, wherein each of the coding cost estimates is independent of a value of coefficient bits in the current precinct; selecting one of the candidate truncation levels according to the corresponding coding cost estimate and a budgeted coding cost for the current precinct, the budgeted coding cost representing an allowable size of encoding the precinct; encoding the current precinct of video data into the video bitstream using the selected truncation level to generate the video bitstream.

In some aspects, the coding cost estimate includes the sign coding cost for each coded coefficient of the current precinct, including coded coefficients having been quantised to a value of zero at the selected truncation level.

In some aspects, the allowable size for encoding the current precinct is determined based on a budget for the current precinct and the coded size of a previous precinct according to a leaky bucket model.

In some aspects, the allowable size for encoding the current precinct is determined based on a re-evaluation of the coding cost estimate that considers the values of coefficients quantised to the selected truncation level.

In some aspects, the method further comprises generating the candidate truncation levels.

In some aspects, the budgeted coding cost for the current precinct is bits-per-pixel multiplied by a number of pixels in the current precinct.

In some aspects, the budgeted coding cost for the current precinct is divided amongst the columns in the current precinct according to relative proportion that each of the columns occupies within the current precinct.

In some aspects, the video bitstream is padded with filter data.

Another aspect of the present disclosure provides apparatus for encoding video data into a video bitstream having a plurality of precincts, the apparatus comprising: means for generating a plurality of coding cost estimates for a current precinct of the plurality of precincts by testing a corresponding candidate coefficient truncation level for the current precinct, each of the coding cost estimates being an over estimate of an encoded data size for coding the current precinct at the candidate truncation level and being determined using a most significant bit plane index, wherein each of the coding cost estimates is independent of a value of coefficient bits in the current precinct; means for selecting one of the candidate truncation levels according to the corresponding coding cost estimate and a budgeted coding cost for the current precinct, the budgeted coding cost representing an allowable size of encoding the precinct; means for encoding the current precinct of video data into the video bitstream using the selected truncation level to generate the video bitstream.

Another aspect of the present disclosure provides a system for encoding video data into a video bitstream having a plurality of precincts, the system comprising: a memory for storing data and a computer program; a processor coupled to the memory for executing the computer program, the computer program including instructions for: generating a plurality of coding cost estimates for a current precinct of the plurality of precincts by testing a corresponding candidate coefficient truncation level for the current precinct, each of the coding cost estimates being an over estimate of an encoded data size for coding the current precinct at the candidate truncation level and being determined using a most significant bit plane index, wherein each of the coding cost estimates is independent of a value of coefficient bits in the current precinct; selecting one of the candidate truncation levels according to the corresponding coding cost estimate and a budgeted coding cost for the current precinct, the budgeted coding cost representing an allowable size of encoding the precinct; encoding the current precinct of video data into the video bitstream using the selected truncation level to generate the video bitstream.

Another aspect of the present disclosure provides a non-transitory computer readable medium having a computer program stored on the medium for encoding video data into a video bitstream having a plurality of precincts, the program comprising: code for generating a plurality of coding cost estimates for a current precinct of the plurality of precincts by testing a corresponding candidate coefficient truncation level for the current precinct, each of the coding cost estimates being an over estimate of an encoded data size for coding the current precinct at the candidate truncation level and being determined using a most significant bit plane index, wherein each of the coding cost estimates is independent of a value of coefficient bits in the current precinct; code for selecting one of the candidate truncation levels according to the corresponding coding cost estimate and a budgeted coding cost for the current precinct, the budgeted coding cost representing an allowable size of encoding the precinct; code for encoding the current precinct of video data into the video bitstream using the selected truncation level to generate the video bitstream.

Another aspect of the present disclosure provides a method of decoding video data of a video bitstream having a plurality of precincts arranged in columns, the method comprising: decoding a header of the video bitstream to determine the number of columns for each precinct; decoding a current precinct to determine a location of each data subpacket within each column of the current precinct; and decoding each of the subpackets of the current precinct based on the corresponding determined locations; determining coefficient bits from the decoded subpackets; and determining decoded video data from the determined coefficients bits based on a filter operation performed on the determined coefficient bits.

Other aspects are also disclosed.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
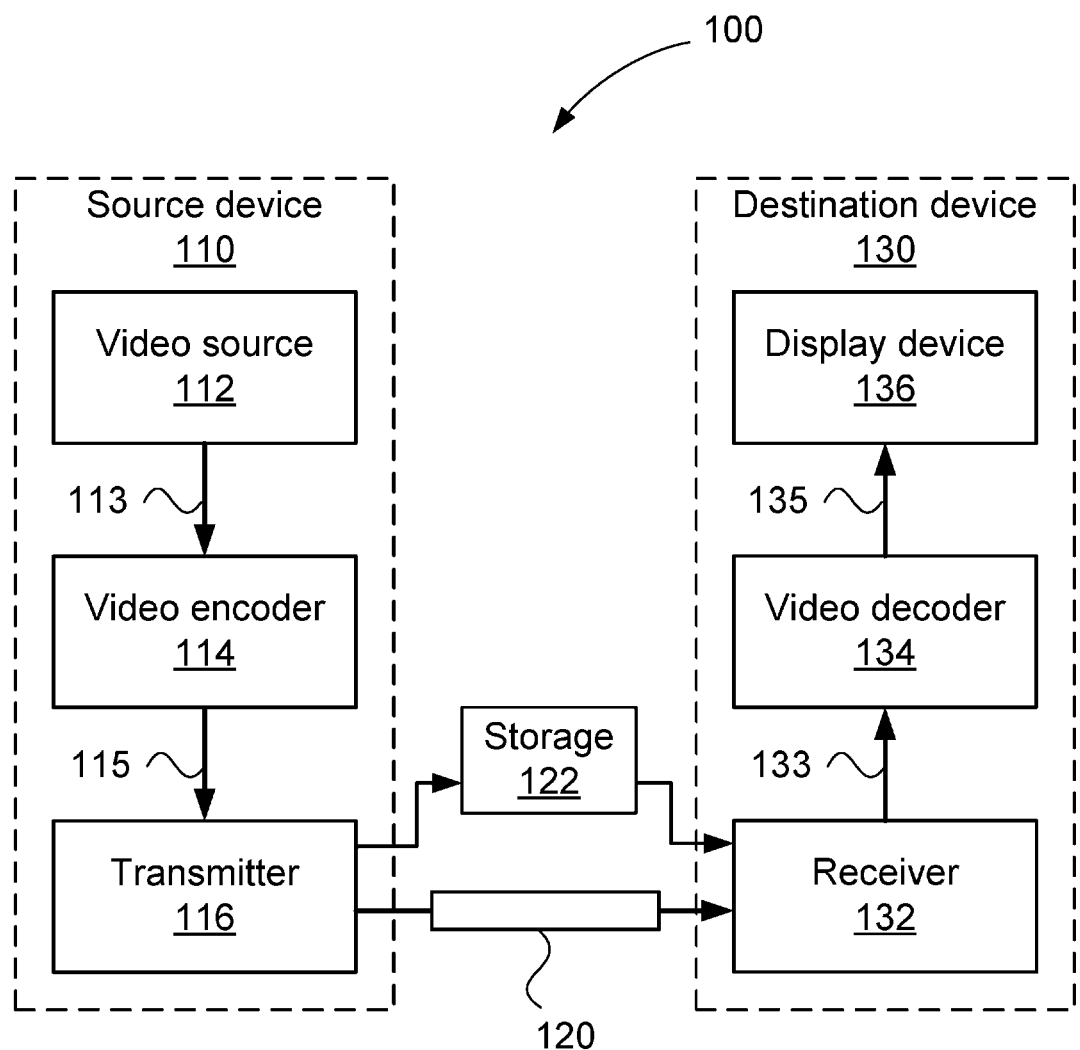
FIG. 1 is a schematic block diagram showing a sub-frame latency video encoding and decoding system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing functional modules of a sub-frame latency video encoding and decoding system 100. A rate control and buffer management mechanism in the video encoding and decoding system 100 ensures that no buffer underruns and resulting failure to deliver decoded video occur (e.g. due to variations in the complexity and time taken for encoder searching of possible modes) of the incoming video data to a video encoder 114, so that decoded video frames from a video decoder 134 are delivered according to the timing of the interface over which the video frames are delivered. The rate control mechanism may make use of estimated (worst case) cost estimation in deciding quantisation parameters to reduce encoder complexity. Moreover, the system 100 may provide concurrent constant bitrate coding via a division of each frame into columns, with independent quantisation control, but with the compressed data for each column packed into a single bitstream.

The interface over which the video frames are delivered may be, for example, SDI. Interfaces such as SDI have sample timing synchronised to a clock source, with horizontal and vertical blanking periods. As such, samples of the decoded video need to be delivered in accordance with the frame timing of the SDI link. Video data formatted for transmission over SDI may also be conveyed over Ethernet (e.g. using methods as specified in SMPTE ST. 2022-6). In the event that samples were not delivered according to the required timing, noticeable visual artefacts would result (e.g. from invalid data being interpreted as sample values by the downstream device). Accordingly, the rate control mechanism ensures that no buffer overruns occur, which would result in production of an invalid bitstream. A similar constraint exists for the inbound SDI link to the video encoder 114, which needs to encode samples in accordance with arrival timing and may not stall incoming video data to the video encoder 114 (e.g. due to varying processing demand for encoding different regions of a frame).

As mentioned previously, the video encoding and decoding system 100 has a latency of less than one frame of video data. In particular, some applications require latencies not exceeding thirty two (32) lines of video data from the input of the video encoder 114 to the output of the video decoder 134. The latency may include time taken during input/output of video data and storage of partially-coded video data prior to and after transit over a communications channel. Generally, video data is transmitted and received in raster scan order (e.g. over an SDI link). Each frame is divided into 'precincts', each precinct generally being two lines of luma samples in height and having a width equal to the width of the frame. Alternately, multiple precincts may coexist side-by-side, collectively occupying the width of the frame, each precinct belonging to a separate 'column'. Then, a rate smoothing window of one or more precincts in a given column is applied to set a target rate for a current precinct in the column. The bitstream is written to a buffer, such that the data for one compressed precinct is assembled in the buffer prior to transmission. When multiple columns are being used, data for each compressed precinct in a row of precincts is assembled in the buffer prior to transmission as a single bitstream.

The system 100 includes a source device 110 and a destination device 130. A communication channel 120 is used to communicate encoded video information from the source device 110 to the destination device 130. In some arrangements, the source device 110 and destination device 130 may comprise respective broadcast studio equipment, such as overlay insertion and real-time editing module, in which case the communication channel 120 may be an SDI link. In general, the communication channel 120 is a 'CBR' channel. As such, the communication channel 120 affords a fixed limit on available bandwidth. In applications where mezzanine compression is not used, uncompressed video is transmitted directly over the communications channel 120. For such applications, the bandwidth of the communication channel 120 is required to be equal to (or may be greater than) the bandwidth of the uncompressed video data. Mezzanine compression addresses the case where the communication channel 120 lacks sufficient bandwidth for uncompressed video data. For compressed video data, the required bandwidth generally varies temporally, with each precinct permitted to vary in compressed size within some determined limit. The video encoder may buffer several compressed precincts prior to transmission. As transmission occurs at a constant bit rate, this buffering gives a greater degree of flexibility in setting the target compressed size for the precinct currently being compressed. Averaged over many precincts, a fixed compressed size that matches the bandwidth of the communications channel 120 is maintained. Buffering is possible in both the coefficient domain (after the Wavelet transform but prior to entropy coding in the video encoder) and in the compressed domain (after entropy coding but prior to transmission). Buffering increases complexity and latency but allows 'look-ahead' operation to occur. Buffering in the coefficient domain allows a look-ahead mode whereby the target budget for a current precinct is attenuated to consider the relative anticipated compressed size of the current precinct against one or more upcoming precincts. The anticipated compressed sizes for precincts can be determined using measures such as summed absolute coefficient magnitude, or summed MSB positions across all subbands. Then, the first precinct target budget is set with some consideration of the relative coding difficulty of the next one or more precincts. This, to some extent, alleviates the issue that no rate forwarding is available for the first precinct. Lower complexity implementations that lack the rate control lookahead window use a fixed size for each compressed precinct of video data. The compressed precincts of video data are conveyed over the communications channel 120. The communications channel 120 may utilise an interface intended for conveying uncompressed data, such as SDI or HDMI, even though in the system 100, compressed data is conveyed.

In other arrangements, the source device 110 and destination device 130 may comprise a graphics driver as part of a system-on-chip (SOC) and an LCD panel (e.g. as found in a smart phone, tablet or laptop computer), in which case the communication channel 120 is typically a wired channel, such as PCB trackwork and associated connectors. Moreover, the source device 110 and the destination device 130 may comprise any of a wide range of devices, including devices supporting over the air television broadcasts, cable television applications, internet video applications and applications where encoded video data is captured on some storage medium or a file server. The source device 110 may also be a digital camera capturing video data and outputting the video data in a compressed format offering visually lossless compression, such that performance of the system 100 may be considered as equivalent to a truly lossless format (e.g. uncompressed).

As shown in FIG. 1, the source device 110 includes a video source 112, the video encoder 114 and a transmitter 116. The video source 112 typically comprises a source of uncompressed video data 113, such as an imaging sensor, a previously captured video sequence stored on a non-transitory recording medium, or a video feed from a remote imaging sensor. The uncompressed video data 113 is conveyed from the video source 112 to the video encoder 114 over a CBR channel, with fixed timing of the delivery of the video data. Generally, the video data is delivered in a raster scan format, with signalling to delineate between lines ('horizontal sync') and frames ('vertical sync'). The video source 112 may also be the output of a computer graphics card (e.g. displaying the video output of an operating system and various applications executing upon a computing device), for example a tablet computer. Such content is an example of 'screen content'. Examples of source devices 110 that may include an imaging sensor as the video source 112 include smart-phones, video camcorders and network video cameras. As screen content may itself include smoothly rendered graphics and playback of natural content in various regions, this is also commonly a form of 'mixed content'. The video encoder 114 converts the uncompressed video data 113 from the video source 112 into encoded video data and will be described further with reference to FIG. 3.

The video encoder 114 encodes the incoming uncompressed video data 113. The video encoder 114 is required to process the incoming sample data in real-time (i.e., the video encoder 114 is not able to stall the incoming uncompressed video data 113, for example, if the rate of processing the incoming data were to fall below the input data rate). The video encoder 114 outputs compressed video data 115 (the 'bitstream') at a constant bit rate. In a video streaming application, the entire bitstream is not stored in any one location. Instead, the precincts of compressed video data are continually being produced by the video encoder 114 and consumed by the video decoder 134, with intermediate storage, for example, in the (CBR) communication channel 120. The CBR stream compressed video data is transmitted by the transmitter 116 over the communication channel 120 (e.g. an SDI link). It is also possible for the compressed video data to be stored in a non-transitory storage device 122, such as a "Flash" memory or a hard disk drive, until later being transmitted over the communication channel 120, or in-lieu of transmission over the communication channel 120.

The destination device 130 includes a receiver 132, the video decoder 134 and a display device 136. The receiver 132 receives encoded video data from the communication channel 120 and passes received video data 133 to the video decoder 134. The video decoder 134 then outputs decoded frame data 135 to the display device 136. Examples of the display device 136 include a cathode ray tube, a liquid crystal display (such as in smart-phones), tablet computers, computer monitors or in stand-alone television sets. It is also possible for the functionality of each of the source device 110 and the destination device 130 to be embodied in a single device, examples of which include mobile telephone handsets and tablet computers, or equipment within a broadcast studio including overlay insertion units.

Figure 2A:
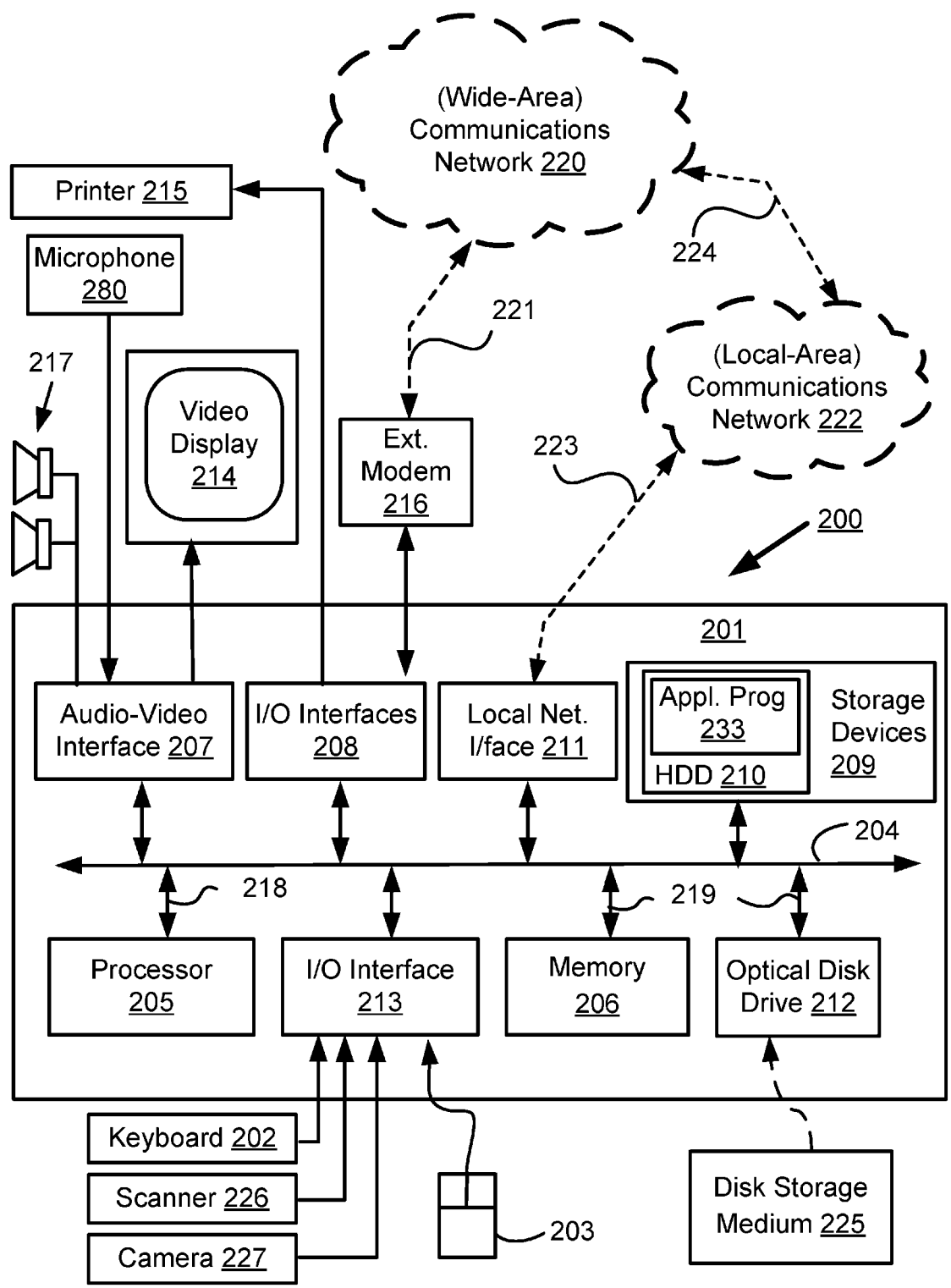
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card and provides an example of 'screen content'. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100, or the source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
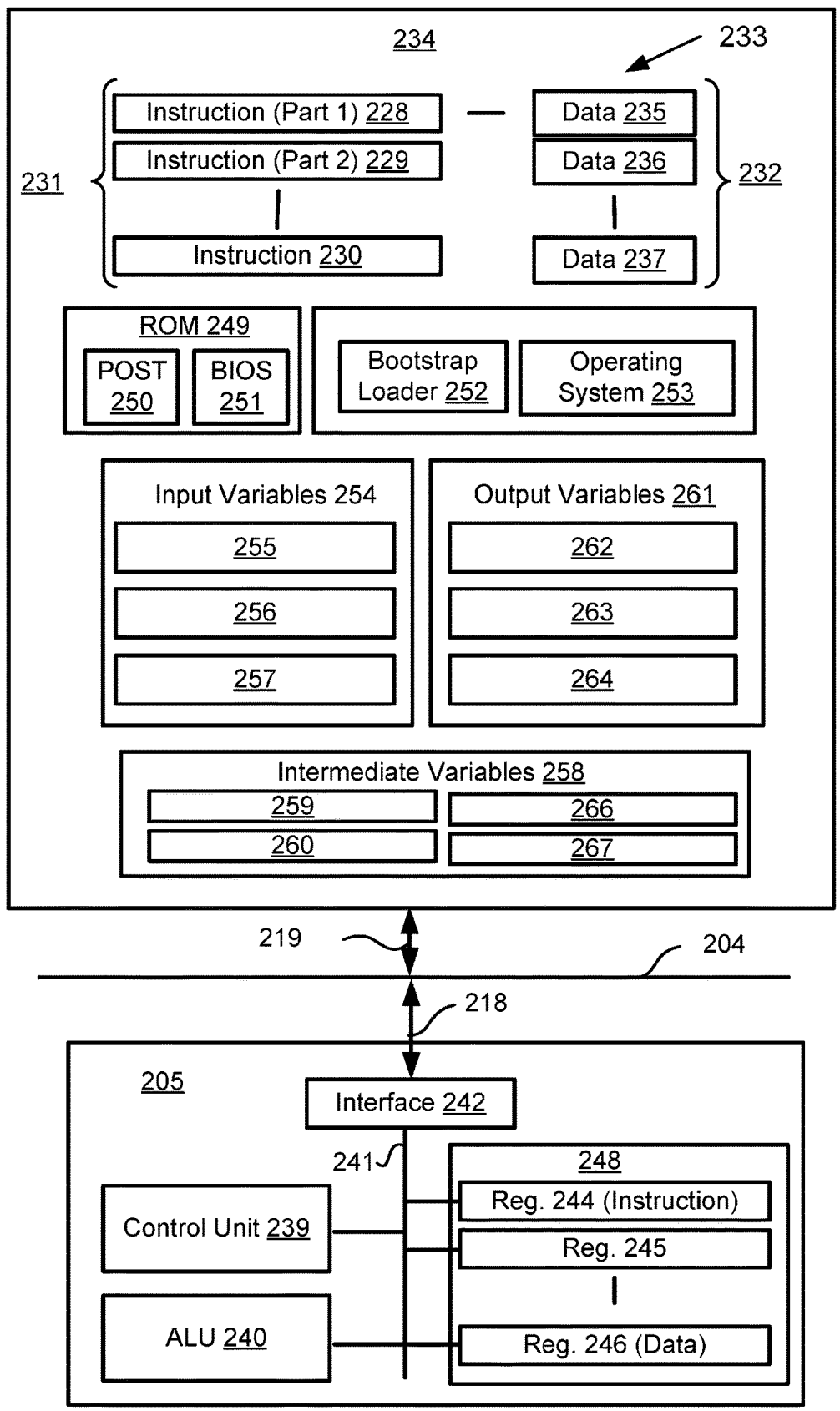

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A need to be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses

241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Figure 11:
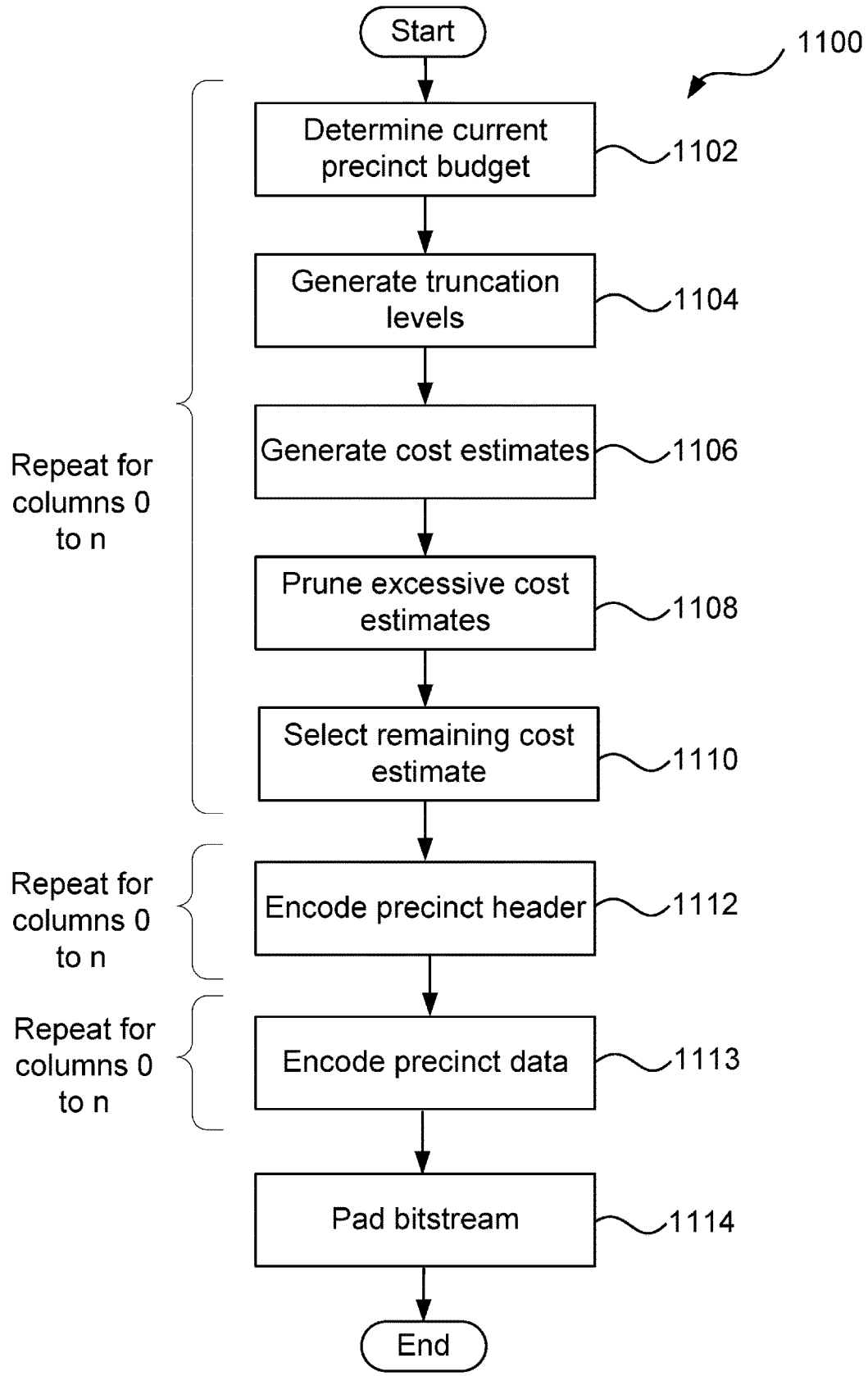
FIG. 11 is a schematic flow diagram showing a method of encoding a bitstream with a worst-case precinct cost estimate used to set a truncation offset.
Figure 12:
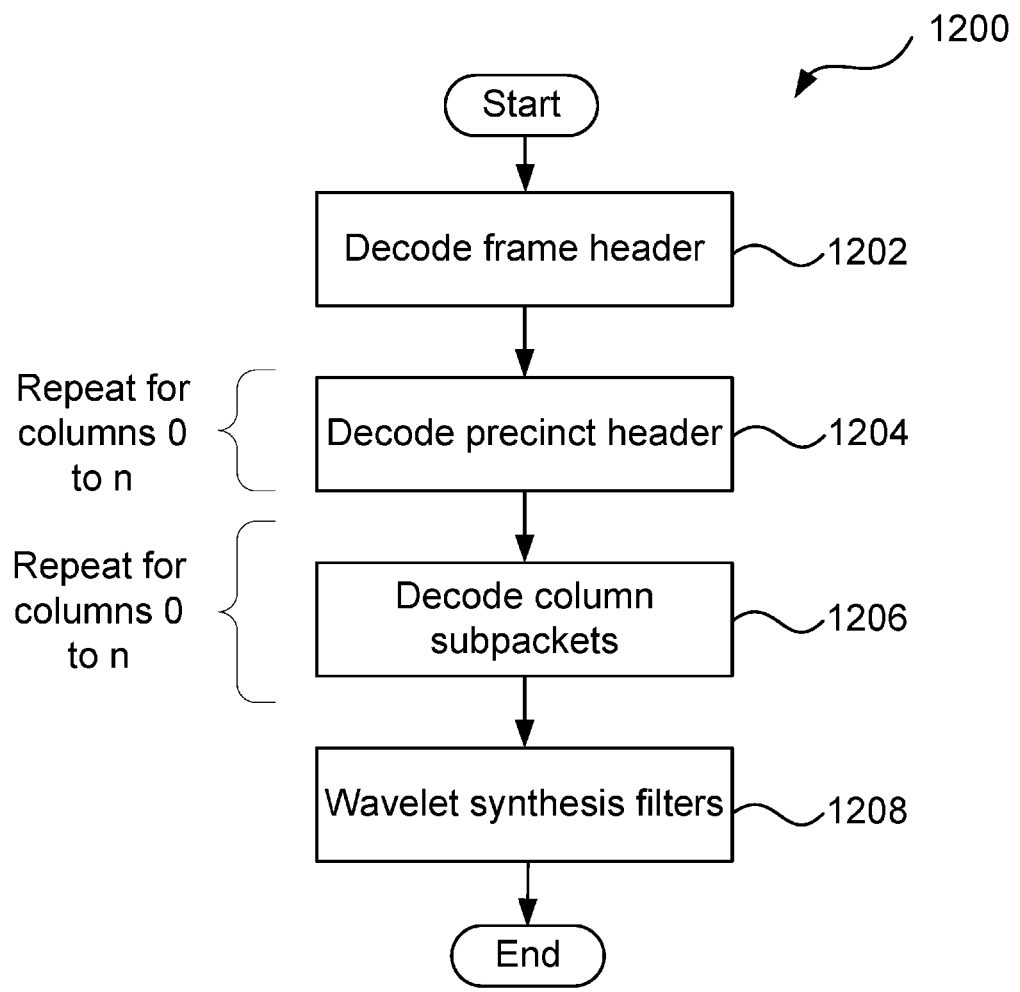
FIG. 12 is a schematic flow diagram showing a method of decoding a bitstream.

Each step or sub-process in the method of FIGS. 11 and 12, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3A:
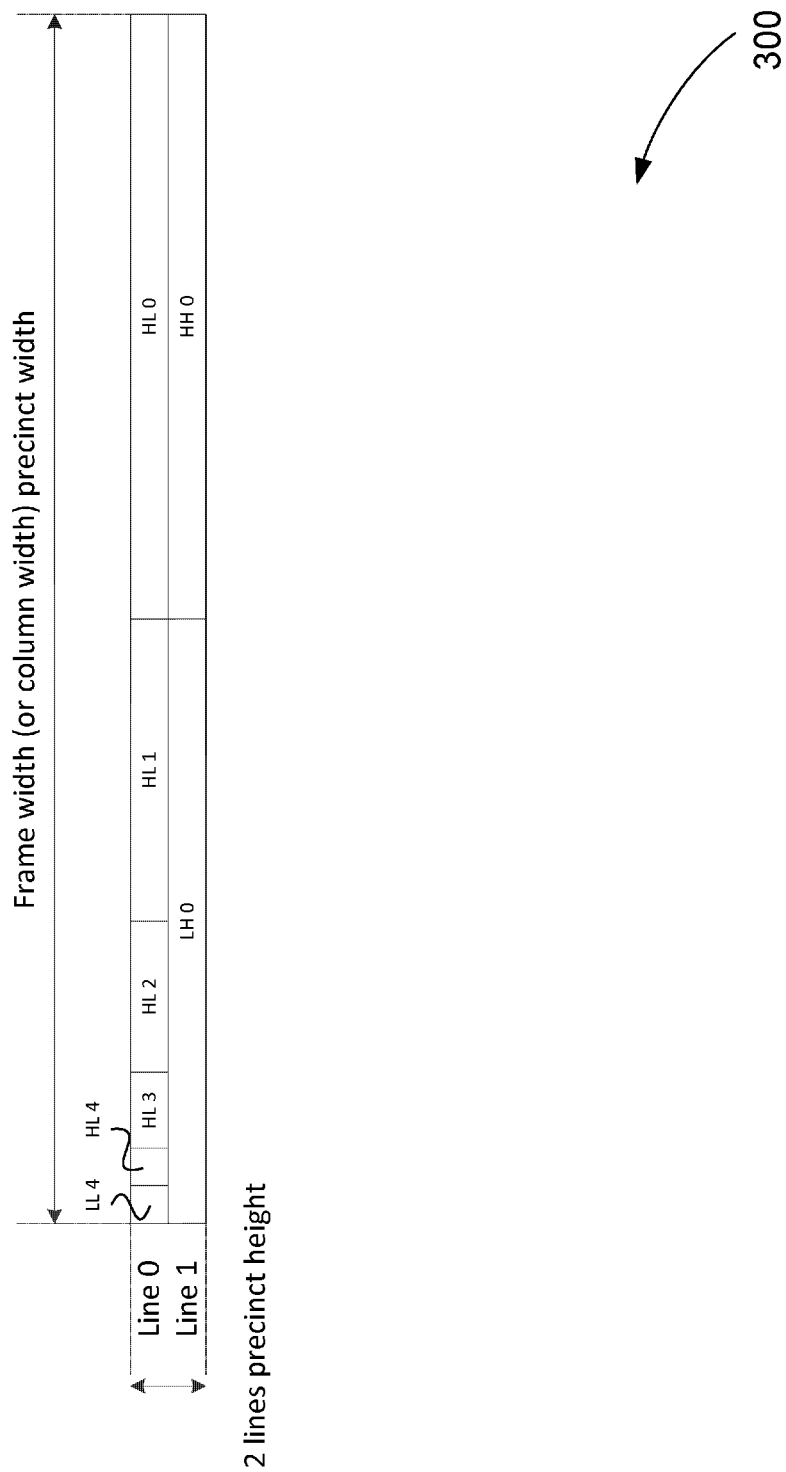
FIG. 3A is a schematic block diagram showing a Wavelet subband decomposition for a precinct.

FIG. 3A is a schematic block diagram showing a Wavelet subband decomposition for a precinct 300 of the video data 113. Each frame of the video data 113 is divided into a number of precincts, each of the precincts generally being two pixel lines in height and being the width of some portion of the frame (up to the entire frame width). The precinct is divided into two 'lines', with subbands allocated to each line. Wavelet coefficients are in the coefficient domain, and so the two lines (groups) define two groups of subbands, rather than a spatial division of the precinct into two lines of pixels. The grouping of subbands into lines also affects the bitstream structure, as described with reference to FIG. 6. A frame is coded by performing the Wavelet transform is applied spanning over all of the horizontally neighbouring precincts in the frame. For low latency operation, the Wavelet transform is applied progressively from the top to the bottom of the frame. A Wavelet transform is applied both horizontally and vertically, with particular decompositional depths in each dimension, as discussed further with reference to FIG. 3B. For example, a precinct may firstly be decomposed using one level vertically, resulting in a set of high-frequency coefficients and a set of low-frequency coefficients. The resulting high-frequency coefficients may then be further decomposed once horizontally, resulting in two subbands identified as 'LH0' and 'HH0' in FIG. 3A, forming 'line 1'. The resulting low-frequency coefficients may also be further decomposed five times horizontally, resulting in six subbands identified as 'LL4', 'HL4', 'HL3', 'HL2', 'HL1', and 'HL0' in FIG. 3A, forming 'line 0'. When decoding a bitstream, it is possible to obtain a lower-resolution 'proxy' of the full image by processing just line 0 subbands and discarding the line 1 subbands. When the Wavelet transform is applied, the number of resulting coefficients is equal to the number of samples that were transformed, regardless of the configuration of decompositions horizontally or vertically. However, the allocation of these coefficients is dependent on the decompositional configuration. Moreover, the statistics of coefficients in different subbands differs markedly. In particular, low-frequency coefficients of subbands progressively deeper in the decompositional hierarchy form a low-pass filtered version of the original precinct, with the degree of filtering and 'resolution' (subband dimensions) corresponding to the precinct dimensions scaled by two to the power of the decompositional depth. High-frequency subbands form a form of 'residual' in the sense that low-resolution subbands can be upsampled and quality improved by adding in high-frequency subband images. This conveys the operation of a Wavelet 'synthesis' filter bank.

High compression efficiency results mainly from the five levels of horizontal decomposition, and the relatively low residual energy present in the high-frequency coefficients of the Wavelet transform. This number of decompositions is repeated for each colour channel in the video data 113. The constraint to relatively few levels (e.g. one) of vertical decomposition is necessitated by the low latency constraint of the application for a mezzanine codec. Generally a 5/3 Wavelet is used. The spatial support (region of samples) contributing to one Wavelet coefficient depends on the Wavelet type (e.g. 5/3) and the chosen decompositional architecture. In the vertical direction, the spatial support of five (5) requires that five (5) rows of samples are buffered in the video encoder 114 (i.e. samples from the precinct above and below the precinct to be transformed are also required). Close to boundaries, the spatial support extends beyond the frame edge. To provide values fulfilling the support requirements for the Wavelet transform, either the edge sample is replicated, or the frame is 'reflected' to provide candidate values outside the dimensions of the frame. Thus, such boundaries represent a potential risk for visual artefacts that may result from such artificial methods to meet the Wavelet transform filter support within the constraint of a finite-sized frame. One consequence of the visual artefacts arises when supporting very large frame sizes, as seen in emerging video formats. A common method to support a larger video format (e.g. UHD 8K) is to use tiles, each conforming to a smaller video format (e.g. UHD 4K). Tiling may enable reuse of existing codecs and transport mechanisms. Also, tiling may enable coding of the larger format where it is not possible for the codec architecture to scale to the larger format. For example, implementation of inherently sequential operations such as Wavelet coefficient coding may not be feasible when support of a format such as UHD 8K is required. The potential for visible artefacts at the tile boundary is highly undesirable, especially for a mezzanine codec purporting to provide visually lossless compression, making tiling a generally undesirable solution for such applications.

Figure 3B:
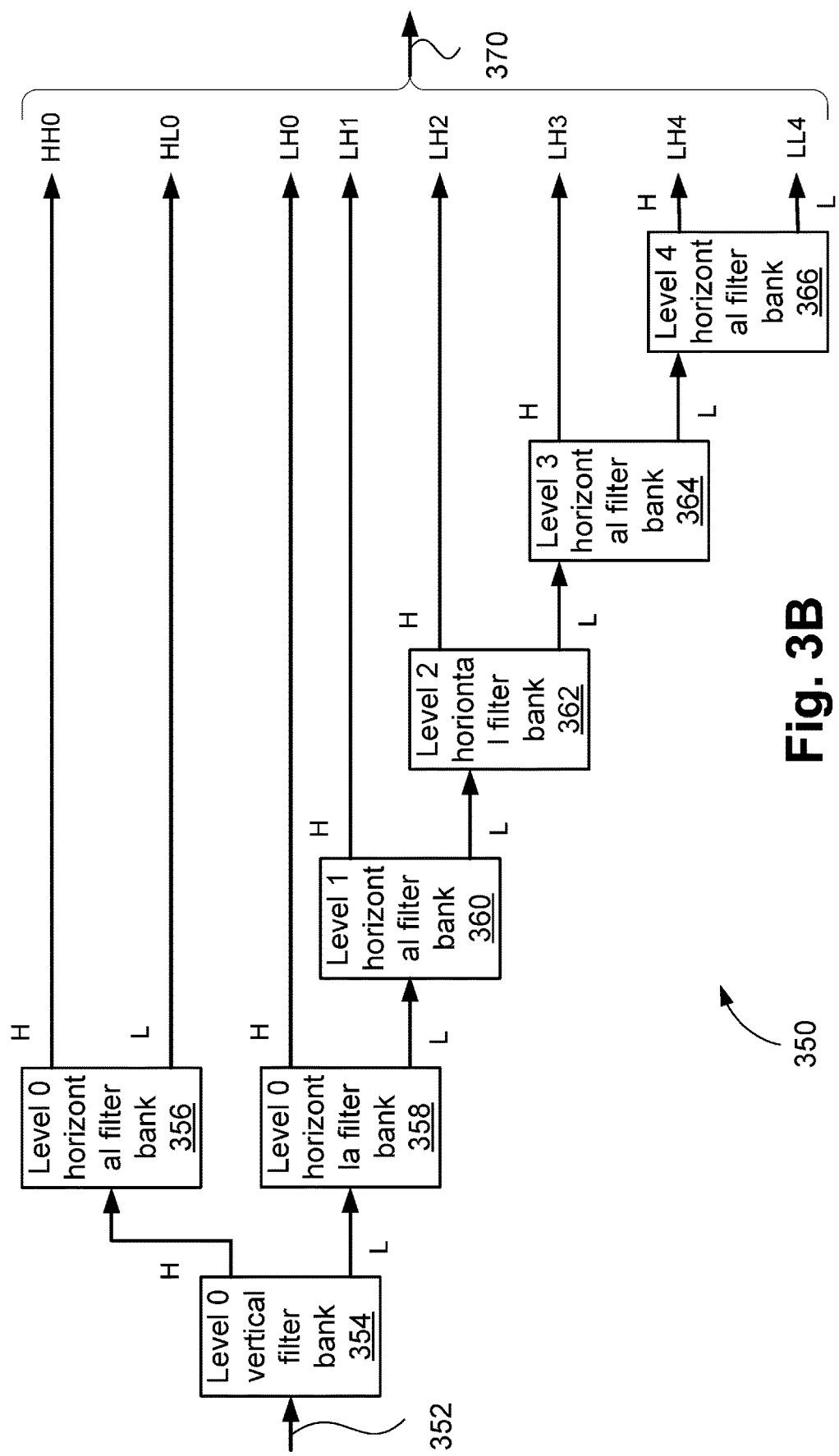
FIG. 3B is a schematic block diagram showing a Wavelet analysis filter bank for the Wavelet subband decomposition of FIG. 3A.

FIG. 3B is a schematic block diagram showing a Wavelet analysis filter bank 350 that accords with the Wavelet decomposition of FIG. 3A. Samples 352 from the video data 113 are input to a level 0 vertical filter bank 354 that performs filtering in a vertical direction. The level 0 vertical filter bank 354 outputs a set of high-frequency coefficients ('H') and a set of low-frequency coefficients ('L'). The set of high-frequency coefficients ('H') and a set of low-frequency coefficients ('L') are further filtered by the level 0 horizontal filter bank 356, the level 0 horizontal filter bank 358, the level 1 horizontal filter bank 360, the level 2 horizontal filter bank 362, the level 3 horizontal filter bank 364, and the level 4 horizontal filter bank 366. The resulting subbands 370 accord with those shown in FIG. 3A.

Figure 4:
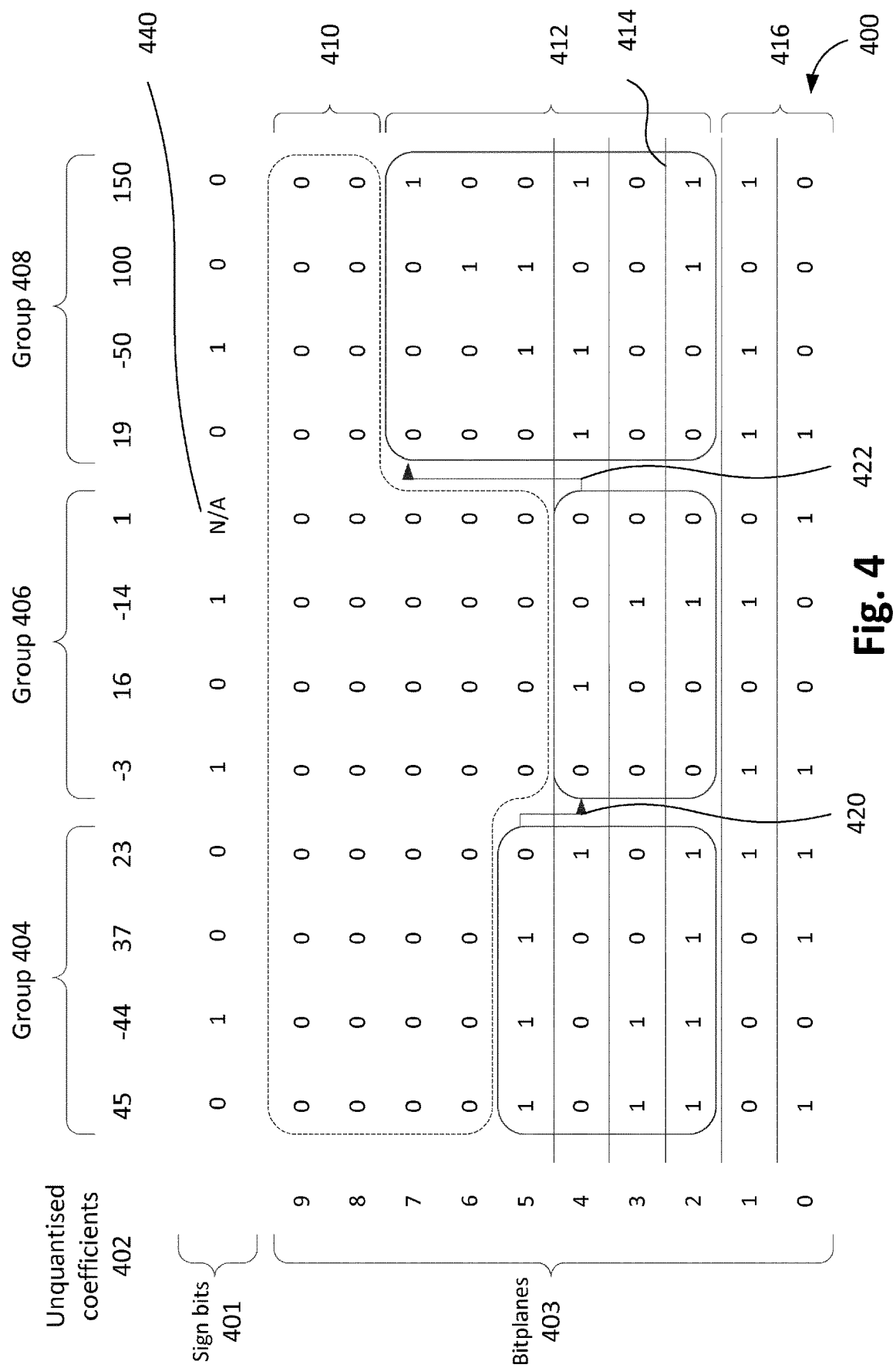
FIG. 4 is a schematic block diagram showing a subband coefficient grouping for representation in a bitstream, with several truncation thresholds shown.

FIG. 4 is a schematic block diagram showing a portion of a subband 400, with unquantised Wavelet coefficients 402 arranged into groups of four (e.g. coefficient groups 404, 406 and 408). A plurality of candidate truncation levels (e.g. 414) are also shown in FIG. 4. Truncation of coefficients results in reduced fidelity of the decoded video data 135, compared to the video data 113. Truncation of coefficients enables compression at a controllable bitrate. A binary representation of each of the unquantised Wavelet coefficient 402 is shown as bitplanes 403. The sign bit associated with each coefficient after quantisation is shown as sign bits 401. After quantisation at a particular truncation level, a coefficient value for the particular truncation level may become zero (even if the corresponding Wavelet coefficient had a nonzero value). For example, the unquantised coefficient value '1' in the group 406, when quantised to the truncation level 414 has a quantised value of zero. As a consequence, there is no associated sign bit (see the illustrated placeholder 440 that could contain a sign bit, if, for example, no truncation operation were applied). For truncation levels where the coefficient value becomes zero, there is no sign bit associated with the coefficient. When there is no sign bit associated with a coefficient, no such bit needs to encoded to or decoded from the bitstream. Thus, the coding cost of sign bits is dependent on the unquantised coefficient values and the applied truncation level. All coefficients in a Wavelet subband are quantised in the video encoder 114 to a particular bitplane, or 'truncation level' (e.g. bitplane 414). The quantisation process has two steps. Firstly, a quantisation offset is added from the unquantised coefficient magnitude (i.e. the magnitude of one of the unquantised coefficients 402). The quantisation rounding offset is equal to $1<<(n-1)$ where n indicates the lowest coded bitplane for the subband (i.e. truncation level). The quantisation offset ensures that when reconstructing coefficients in the video decoder 134, the reconstructed value is closer to the value seen in the video encoder 114, allowing for inevitable loss of precision resulting from the application of truncation.

Considering a given coefficient group (containing four coefficients), the coefficients contained therein, when represented in binary, form a list of 'bit planes'. Then, bit plane n contains four bits, with each bit corresponding to bit position n of one of the four coefficients. Finally, bitplanes above a particular threshold contain only zero values. This particular bitplane index is referred to as a most significant bit (MSB) position index. At this most significant bit (MSB) plane index, at least one of the four bits associated with the group of coefficients will be nonzero. Bitplanes above the MSB position index for a given coefficient group are implicitly zero and do not need to be coded in the bitstream. Considering all groups of coefficients in a subband, the MSB-position indices form a contour above which all bits (e.g. 410) are known to be zero and thus need not be coded. Then, considering the candidate truncation level (e.g. 414) a region of coefficient data bits 412 that need to be coded exists. The coefficient bits are coded after addition of a quantisation offset, and the quantisation offset is dependent upon the candidate truncation level. The bit values shown in FIG. 4 for the bitplanes 403 are prior to quantisation. As such, it can be seen that nonzero bits may be present in the bitplanes below which truncation occurs (i.e. 416). Bitplanes below the candidate truncation level (i.e. 416) are not coded in the encoded bitstream 113 and thus are discarded.

Not shown in FIG. 4 is a coefficient group where all the associated unquantised coefficients have sufficiently low magnitude that no bitplanes need to be coded for this coefficient group. For such coefficient groups, the zero-valued bits 410 extend to the truncation level of the subband. Such coefficient groups may be referred to as 'uncoded coefficient groups'. Uncoded coefficients are detected by comparing the MSB position of the coefficient group with the truncation level. Moreover, uncoded coefficient groups are known to have no associated sign bits. The absence of such sign bits is detected easily by the comparison operation mentioned above. In contrast, detecting the absence of a sign bit such as 440 requires quantisation at each truncation level, which is a more computationally costly operation.

The MSB-position indices are generally coded using a predictive scheme, such as a horizontal prediction spanning each subband. As such, delta values (e.g. signalling the change in MSB-position indicated by 420 and 422) are coded. A vertical prediction scheme whereby the MSB-position index is predicted using the MSB-position index of the corresponding coefficient group from the above precinct is also available. A 'RAW' mode, whereby each MSB position in a subband is coded using a 4-bit fixed length codeword is also available. The RAW mode imposes a worst-case limit on the cost of coding MSB positions, as the encoder is required to select RAW mode if all other available modes result in a higher coded cost. Where the MSB position of one or more coefficient groups is below the truncation level of the subband, no bitplanes are coded for these coefficient groups. Also, instead of coding the MSB positions for such coefficient groups, a mode of coding to skip to the next coefficient group having an MSB position exceeding the truncation level is used. This reduces coding cost.

When the video encoder 114 tests each candidate truncation level, to produce the correct coding cost the presence of absence of a sign bit needs to be known. Determining the presence of absence of a sign bit requires knowing whether the quantised coefficient is nonzero (sign bit present) or zero (sign bit absent). To determine the quantised coefficient value, a different quantisation rounding offset for each truncation level for quantisation is applied. Applying the different quantisation rounding offset results in increased complexity due to additions and other intermediate calculations. As a result of the test, the significance of each coefficient would be determined, and thus the presence of an associated sign bit. As discussed further with reference to FIGS. 7 and 8, complexity reduction is achieved in the system 100 in relation to sign bit handling.

Instead of having an independent truncation level for each subband in a precinct, the truncation level for a subband is determined relative to a global threshold, which may be referred to as a 'scenario' or 'precinct quantisation'. The precinct quantisation is signalled in a precinct header. Then, the truncation level for each subband is determined by applying a subband-specific offset to the scenario. The subband-specific offsets are signalled in a 'weights table' as a list of 'gains', forming a 'gain table', with one gain or offset signalled per subband. A predetermined weights table can be supplied to the video encoder 114. The weights table needs to appear in the bitstream prior to the first slice of a picture, for each picture coded in the bitstream. The gain table offsets allow the proportionate allocation of bits, and thus the relative precision of coefficients, among different subbands to be altered. In particular, the gains enable compensation for the gain inherent in each subband that results from the depth of the considered subband decompositional hierarchy. Such compensation results in uniform precision of coefficients across all subbands. Uniform precision results in maximising PSNR of the decoded video. Alternatively, particular subbands can be given increased precision. Subbands deemed to make a greater contribution to subjective quality can be given increased precision. The determination of which subbands should be afforded increased precision may be made using either or both of visual perception models and subjective experiments. The resulting set of offsets is referred to as a 'visual weighting'. The scenario thus provides a course level of control for quantisation and thus for a bitrate of, for example, the entire precinct, with each reduction in the scenario introducing one bit per coefficient over the entirety of the precinct.

An additional control, known as the 'precinct refinement', permits coding an additional bitplane of a subset of the subbands in the precinct. The subbands are ranked in terms of their contribution to PSNR (in order of decreasing contribution) and the refinement enables coding one extra bitplane for the first n subbands of the ranked list of subbands. The ranking is signalled in the weights table via a list of priorities. As such, a finer degree of control for the quantisation of coded coefficients within a precinct is provided. So, quantisation of coefficients in each precinct is controlled via the two parameters: scenario and refinement. Moreover, where a precinct is divided into multiple columns, as discussed with reference to FIG. 5, each column has independent control over quantisation of coefficients associated with that column (i.e. the subset of the coefficient groups in each subband that reside in the respective column).

Given the grouping of coefficients into sets of four, and the possibility of various frame widths, it is possible for some coefficient groups (e.g the rightmost one in any subband) to include less than four coefficients. Such coefficient groups may be padded with additional values to reach the required group size, at the expense of some bitrate. Alternatively, the group size may be varied in such cases. Varying the group size requires additional complexity as the minimum unit of processing is no longer always 4 bits. For example, barrel shifter logic may be required. As such, constraining precinct size to only use coefficient groups of four where possible is beneficial. Such a constraint needs to be place for all subbands to achieve the complexity reduction, and so the deepest level of Wavelet decomposition sets the most severe constraint. The constraint is in the form of restricting precinct size to particular values. For example, with groups of four and five levels of decomposition horizontally, the constraint is that precinct width must be a multiple of $4 \times 2^5 = 128$ samples. This constraint is discussed further with reference to FIG. 5.

Figure 5:
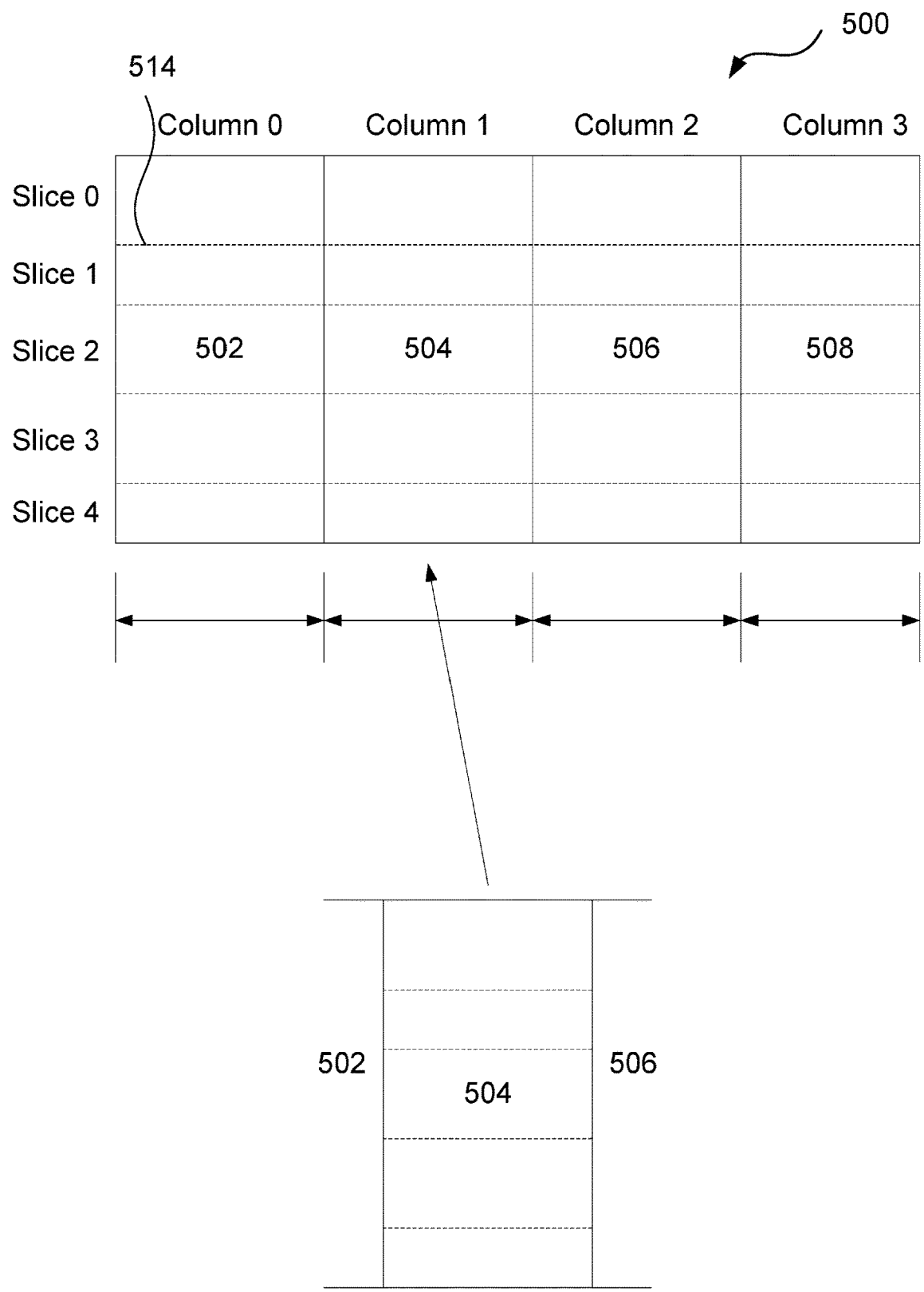
FIG. 5 is a schematic block diagram showing a division of a frame into multiple columns.

FIG. 5 is a schematic block diagram showing division of a frame 500 into multiple columns, which may be referred to as a 'columnar arrangement'. When one column is used, a precinct spans the entire width of the frame. When multiple columns are present, a plurality of precincts are arranged horizontally in a row (beyond the usual vertical arrangement of precincts). Four columns, labelled 'Column 0' to 'Column 3' are shown in FIG. 5. The frame 500 has an '8K' resolution (7680×4320 pixels). At a given frame rate, the '8K' resolution of the frame 500 equates to a quadruple of the pixel rate compared to a 4K resolution (3840×2160 pixels). A tile-based approach to coding is possible, with four '4K' tiles in use. However, the tile-based approach requires significant buffering of at least half the frame height, violating the low latency operational requirement of the mezzanine codec. To maintain low latency operation, it is preferable to operate in a 'columnar' mode. For example, an arrangement of four tile size of 1920×4320 pixels in size is possible. The frame 500 is also divided into a number of slices (five slices labelled 'Slice 0' to 'Slice 4' are shown in FIG. 5). The boundary between slices is shown with a dashed line (e.g. 514). Slice boundaries span the width of the frame, in particular, slice boundaries span all columns and a given slice boundary occurs at the same vertical position across all columns.

The columnar arrangement described above with reference to FIG. 5 allows for low latency operation. The columnar arrangement, and consequent presence of a row of precincts, can be realised using four instances of the mezzanine codec. One consideration is that synchronisation of the four instances needs to be provided. Moreover, the four resulting bitstreams need to be synchronously transported from each instance of the video encoder 114 to each instance of the video decoder 134. The four bitstreams may be time-division multiplexed (TDM) onto a single communications channel 120, with some latency added to accommodate buffering portions of each bitstream for delivery to and extraction from the communications channel 120. Without additional overhead to synchronise the four columns, the timing with respect to external channel synchronisation (i.e. vertical sync over SDI link) needs to be known a priori by both the encoder 114 and the decoder 134. A TDM approach permits reuse of existing encoder and decoder modules, each supporting a lower video format, without modification, to support a higher video format. TDM approaches only require necessary wrapping logic to perform the time division multiplexing in the uncompressed and the compressed domain and at the expense of increased latency (e.g. one line added at the encoder and decoder) to support the time-division multiplexing and demultiplexing. Moreover, TDM approaches may result in the introduction of boundaries at the interface between adjacent columns. Within each encoder and decoder instance, the sample extension process is applied to provide Wavelet filter support for samples located outside of the current column, even when the locations of the samples fall in the adjoining column. The sample extension process risks introduction of visual artefacts at column boundaries.

One mitigating method to avoid the risk of visual artefacts at column boundaries is to perform the Wavelet transform across the entire width of the frame but for other stages, such as entropy coding, to use the column-based approach. It is possible to perform the Wavelet transform across the entire width of the frame but for other processing stages (i.e. quantisation and entropy coding) to use the column-based approach because dependencies within the Wavelet transform are limited spatially to the filter support convoluted in accordance with the decompositional hierarchy. As there are no sequential dependencies spanning the frame, it is possible to implement the Wavelet transform concurrently, in segments. Then, the coded transmission in the compressed domain, which results in variable-length segments, may be considered. As described above, time-division multiplexing compressed bitstream according to a priori timing results in extra latency to accommodate the variable-length compressed columns being conveyed over concurrent fixed bit rate channels. In one arrangement, a bitstream syntax that enables precincts to be coded as columns may be constructed. Splitting the sequential entropy coding paths from the entire frame width to the smaller column regions that collectively span the frame enables parallelism of these critical parts of the video encoder and decoder. As each column is processed by entropy coding modules having limited worst-case parsing throughput capability, each one operates at a constant bit rate. The constant bit rate of the column is set to the overall compressed bitrate scaled proportionately to the ratio of the column width to the frame width. To achieve independent control of the bitrate of each column, separate scenario and refinement values are signalled for each column in the precinct header. Then, the worst case coding and parsing capability of each entropy encoder and decoder is confined to the bitrate of the column, instead of the bitrate of the entire frame, as would be the case were only one entropy encoder and entropy decoder used.

At the deepest level of horizontal decomposition (i.e. the fifth level) each coefficient is coincident with 32 pixels horizontally (considering the largest magnitude coefficient of the low-pass portion of the Wavelet filter). Then, with coefficients grouped into sets of four, a region 128 pixels wide is coincident with one coefficient group, at the fifth and highest decomposition level. To reduce instances of partially occupied coefficient groups that may occur (at any decomposition level) on the frame right boundary, column boundaries are restricted to multiples of 128 pixels, relative to the left frame boundary.

Figure 6:
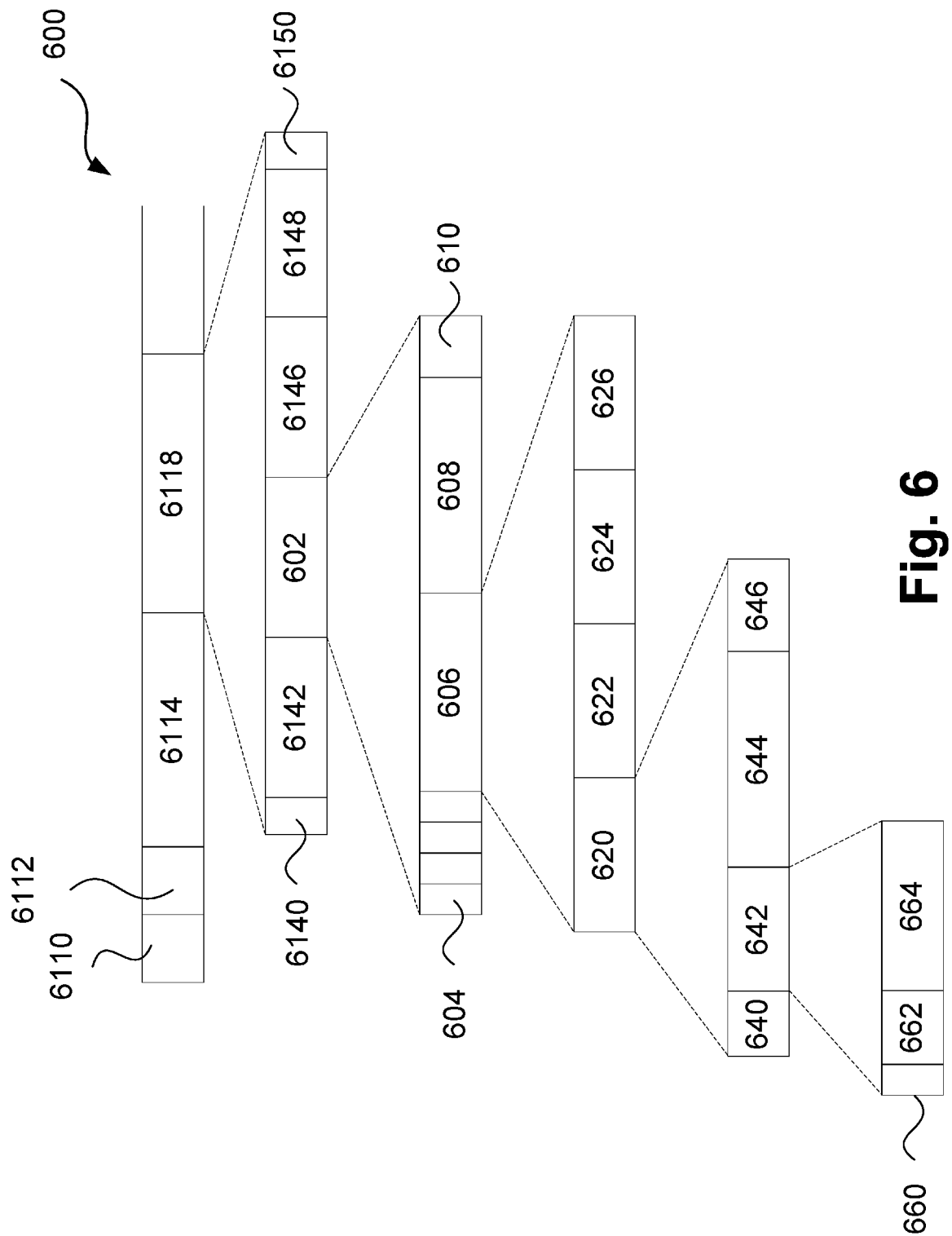
FIG. 6 is a schematic block diagram showing a bitstream decomposition for a precinct with multiple columns.

FIG. 6 is a schematic block diagram showing a codestream syntax 600 for representing a frame of compressed video data having multiple columns of coded data for increased parsing throughput. Each compressed frame is referred to as a 'codestream' and a sequence of concatenated codestreams forms a bitstream. Each codestream includes a picture header 6110, which defines picture-level parameters including picture size, bit depth, coding tool configuration (Wavelet transform depth horizontally and vertically, Wavelet kernels). In particular, the picture header 6110 defines the number of columns, and the column boundaries, to be used for the frame. Having specified the number of columns, a list of column horizontal positions for columns other than the leftmost column is coded in the picture header 6110 (which implicitly is aligned to the left of the frame). Each column left position in this list may be specified in units of luma samples, offering the greatest degree of flexibility in column positioning within a frame. In one arrangement, each column left position is specified in units of the MSB position group size (i.e. 4) multiplied by two to the power of the horizontal Wavelet decompositional depth (i.e. generally 5). The default configuration specified in the picture header 600 thus results in units of 128 luma samples. Such arrangements ensure that for all columns other than the rightmost column, each coefficient in the coefficient groups of these columns corresponds to a coefficient obtained from the Wavelet transform stage. Only for the rightmost column may padding or truncation be necessary, resulting from frame sizes that are not aligned to the coefficient group size, at up to the deepest level of horizontal decomposition. In yet another arrangement, the column left positions are not explicitly coded in a list and are instead inferred. When the column widths are inferred, the width of the frame is divided by the number of columns, obtaining an approximate width. From this approximate column width, approximate column boundaries are derived. Then, each approximate column boundary is rounded to the column width granularity (generally 128 luma samples) to obtain the final column boundaries.

Some examples are shown below:

1920 divided into three columns: 1920/3=640 column width. As 640/128=5, the column width is 640 pixels exactly for all three columns and the horizontal offsets are 0, 640, and 1280.

2048 divided into three columns: 2048/3=682.67 column width. Noting that, 682.67/128=5.33, column widths are as follows:

Column 0: Offset 0, Width=640 pixels. (5.33 rounded down to 5, then multiplied by 128).

Column 1: Offset 640, width=1408-640=768 pixels (2×5.33 gives 10.66, then round up to 11 and multiply by 128 to find the absolute column boundary edge. Then, subtract the offset from the column 0 rightmost edge to find the column 1 width).

Column 1: Offset=1408, width=640 pixels (set to consume remainder of the frame width).

Note that for HD 2K, UHD 4K, and UHD 8K (1920, 3840, 7680 widths, respectively), columns are multiples of 128 pixels wide when the number of columns is small (e.g. from two to five).

These inferred (or 'implicit') boundaries have several advantageous properties: Firstly, constraining column boundary starting positions eliminates any partially-used coefficient groups in columns other than the rightmost column. Such elimination may simplify the logic associated with these columns, as each coefficient group does not need to handle the cases of 1, 2 or 3 valid coefficients of the 4 available coefficients for a given coefficient group. However, such logic is required for the rightmost column, as the frame width, and thus the rightmost column width, is not otherwise constrained. For common formats, such as 1080p HD (1920×1080 resolution) and 2160p UHD (3840×2160 resolution), the default granularity for column width of 128 luma samples does not result in the introduction of any partially-populated coefficient groups. Thus, for implementations constrained to use such formats, such logic in the rightmost column is also not necessary, even though the picture header does permit signalling of frame widths that depart from those specified in the above-mentioned commonly used formats.

Secondly, no explicit column positions are signalled in the picture header. As the number of columns may vary, if an offset for each column were to be signalled, this would result in signalling a variable-length list of offsets. For ease of implementation, it is preferred that the picture header have a fixed length. In particular, it is preferred that the length of the picture header may be known without the need to parse the contents of the picture header, for reduced complexity. If a variable-sized list were included in the picture header, instead of a fixed length, such a parsing step would be needed. Maintaining a fixed-length picture header offers some advantage for parsing a codestream, for example, by allowing recognition of a picture header and moving to the next section of a codestream without having to parse the contents of the picture header to discover the length of the picture header. Additionally, the implicit boundaries are defined to substantially equalise the column width across the frame. Such equalisation reduces the worst-case throughput requirement of the entropy encoding and decoding stages of each column.

In one arrangement of the system 100, a minimum column constraint of four columns is imposed when the UHD 8K format is in use. As a consequence, the throughput of compressed data of each column does not exceed the throughput of compressed data when the UHD 4K format is in use (with other factors, such as chroma format and frame rate kept unchanged). Moreover, portions of the design for the UHD 4K, i.e. hardware designs implementing the entropy encoder and decoder, may be reused for UHD 8K support. Such hardware designs for the UHD 4K case generally already make full use of the capability of the target technology, e.g. Xilinx Artix FPGA, in terms of timing demands, and thus cannot be scaled to the higher format without using a substantially more capable target technology (which may not exist or may be uneconomic).

A weights table 6114 specifies the gain and the priority for each subband. The gain specifies the gain applied to all coefficients in the applicable subband. The gain is applied to the applicable subband in all precincts and in all columns of the frame. The priority is used to set an order of subbands for insertion of refinement bitplanes, as discussed with reference to FIG. 4. As with the gains, the list of priorities is signalled at most once per frame and applied to all precincts in all columns in the frame.

The remainder of the frame is stored in compressed form as a sequence of slices, such as slice 6114, 6118. A slice holds a collection of precincts, grouped as shown with reference to FIG. 5. Slices form one tool for parallelism, providing a degree independence for encoding and decoding of different slices within a frame. Sequences of adjacent precincts (each spanning the frame width) are grouped into slices. As such, slices divide the frame horizontally. For parallel processing, independent processing elements may concurrently process different slices. This concurrent processing implies a degree of buffering that spans across slices and thus results in latency exceeding the required 32-lines of end-to-end latency. The columnar arrangement of a frame is also able to achieve parallelism, including for software implementations, without introducing additional latency. In particular, the independent processing elements operating on each column are able to operate in parallel encoding or decoding different precincts within a row of precincts. The independent processing elements need to be timed appropriate that completion of processing each precinct in the row of precincts is simultaneous, permitting the independent processing elements to progress to the next row of precincts in a synchronised manner. A consequence of this synchronised processing is that no additional latency is incurred when a columnar arrangement is used compared to use of single precincts spanning the frame width.

A slice, e.g. 6118, includes a slice header 6140, one or more precincts (e.g. 6142, 602, 6146, 6148) and a slice footer 6150.

A compressed precinct 602 includes one or more precinct headers, such as a precinct header 604, a line 0 subpacket group 606, a line 1 subpacket group 608, and (optionally) padding data 610. The line 0 subpacket group 606 and the line 1 subpacket group 608 define the grouping of subpackets and hence impose an ordering constraint on the subpackets in the encoded bitstream 114. However, the subpacket groups 606 and 608 do not include any additional overhead (e.g. header syntax).

One precinct header is required per column in the frame 500. The precinct header 604 is the first in a sequence of four precinct headers and includes signalling as to which column it belongs (i.e. the leftmost column), with truncation level signalled for the applicable column, by way of scenario and refinement syntax elements. When one column is in use, a sequence of precinct headers indicates a downward scan progression of precincts in the frame. When multiple columns are in use, this progression order is extended in a horizontal left-to-right direction within each row of precincts, for the columns located at a given vertical position in the frame. As such, at a given vertical position in the frame, the precinct headers are further constrained to a left-to-right ordering of the columns, with one precinct header present for each column. The use of a fixed-size precinct header, with one instance per column, avoids the need to parse the contents of each precinct header when traversing the bitstream. This avoids the need to introduce any explicit signalling into the precinct header to identify the association between each precinct header and each column. FIG. 6 shows four precinct headers (e.g. 604) adjacent and prior to further data associated with the precincts. Subbands in the precinct of each column are grouped into 'lines', with generally two lines resulting from the precinct height of two, named 'line 0' and 'line 2'. This grouping enables extraction of a low resolution variant by only decoding data stored in 'line 0'. This grouping spans the entire frame width and the precinct headers associated with the columns within each line are stored prior to the line data to facilitate parsing the line data.

The line data includes the line 0 subpacket group 606, which includes coefficient data for the 'LL4', 'HL4', 'HL3', 'HL2', 'HL1', and 'HL0' subbands and the line 1 subpacket group 608, which includes coefficient data for the 'LH0' and 'HH0' subbands, as described with reference to FIG. 3.

Each of the subpacket groups 606 and 608 are further divided into one or more subpackets, according to the columnar arrangement of the frame. For example, with four columns in use, the subpacket group 606 is divided into subpackets 620, 622, 624, and 626, corresponding to the leftmost to the rightmost columns (i.e. 502 to 508). For high-throughput implementations, the subpackets are processed in parallel in the video processing system 100. As such, signalling is needed to enable locating the start point of each subpacket in the encoded bitstream 113 without requiring sequential parsing of the contents of the subpackets. The start point of each subpacket in the encoded bitstream 113 may be located using a subpacket start offset table in the precinct header, encoding the start offset of each subpacket in the precinct relative to the location of the precinct header. Alternatively, each subpacket group may include a subpacket start offset table encoding the starting offset of each subpacket in the subpacket group relative to the location of the containing subpacket group. Finally, each subpacket may include a subpacket header (e.g. 640) encoding the length of that subpacket, permitting traversal over the subpackets.

Each subpacket (e.g. 620) includes a MSB position block 642, a data block 644, and a sign block 646. The MSB position block 642 includes a MSB position block length 660, initial MSB position values 662, and running MSB position values 664. The MSB position block length 660 encodes the length of the MSB position block 642 in units of 4 bits. The initial MSB position values 662 encode MSB position values for coefficient groups having no predictor. For example, when using horizontal MSB position prediction, there is no coefficient group to the left of the leftmost coefficient group of a column. Therefore, the leftmost coefficient group has no predictor and the associated MSB position value is encoded in the initial MSB position values 662 using 4 bits instead of using delta (sign bit and unary) coding. Then, MSB position values for the remaining coefficient groups in the subpacket are coded using delta values. The division of the subband into multiple columns, each column having the associated subpackets contained within a subpacket group, implies the presence of potentially multiple initial values (one per column per subband for the horizontal prediction case). The division of the subband into multiple columns, each column having the associated subpackets contained within a subpacket group facilitates parallel parsing of subpackets within each subpacket group. Then, the data block 644 encodes bitplanes of coefficient groups (e.g. 412). Finally, for each significant coefficient one sign bit is coded in the sign block 646. The sign block 646 terminates with 4-bit alignment. The data block 644 and the sign block 646 also include a length field in a fixed-size header located at the beginning of the respective blocks. These lengths, in addition to the MSB position block length 660 may be used to locate the subpackets in the subpacket group (e.g. 606) without performing decoding of any entropy coded data contained therein. In particular, the comprising parts of a subpacket (e.g. data block, sign block, and MSB position block) each include a header that contains a length field. The presence of these length fields enables traversal through the collection of subpackets in each line using pointer indirection and/or offsetting operations. As a compressed precinct is buffer prior to decoding by the video decoder 134, and prior to transmission by the video encoder 114, such traversal is possible without risk of referencing data that is not yet (or no longer) available. This property is known as the ability to 'traverse' the subpackets in the subpacket group. The ability to traverse the subpackets enables each subpacket to be identified to the contents supplied to separate instances of the entropy decoder in the video decoder 134, for columnar operation. In the video encoder 114, separate streams can be created using different entropy encoders and assembled into a single bitstream to convey to the communications channel 120.

For MSB position vertical prediction, the predictors may not cross a slice boundary, facilitating parallel processing (albeit at higher latency).

Figure 7:
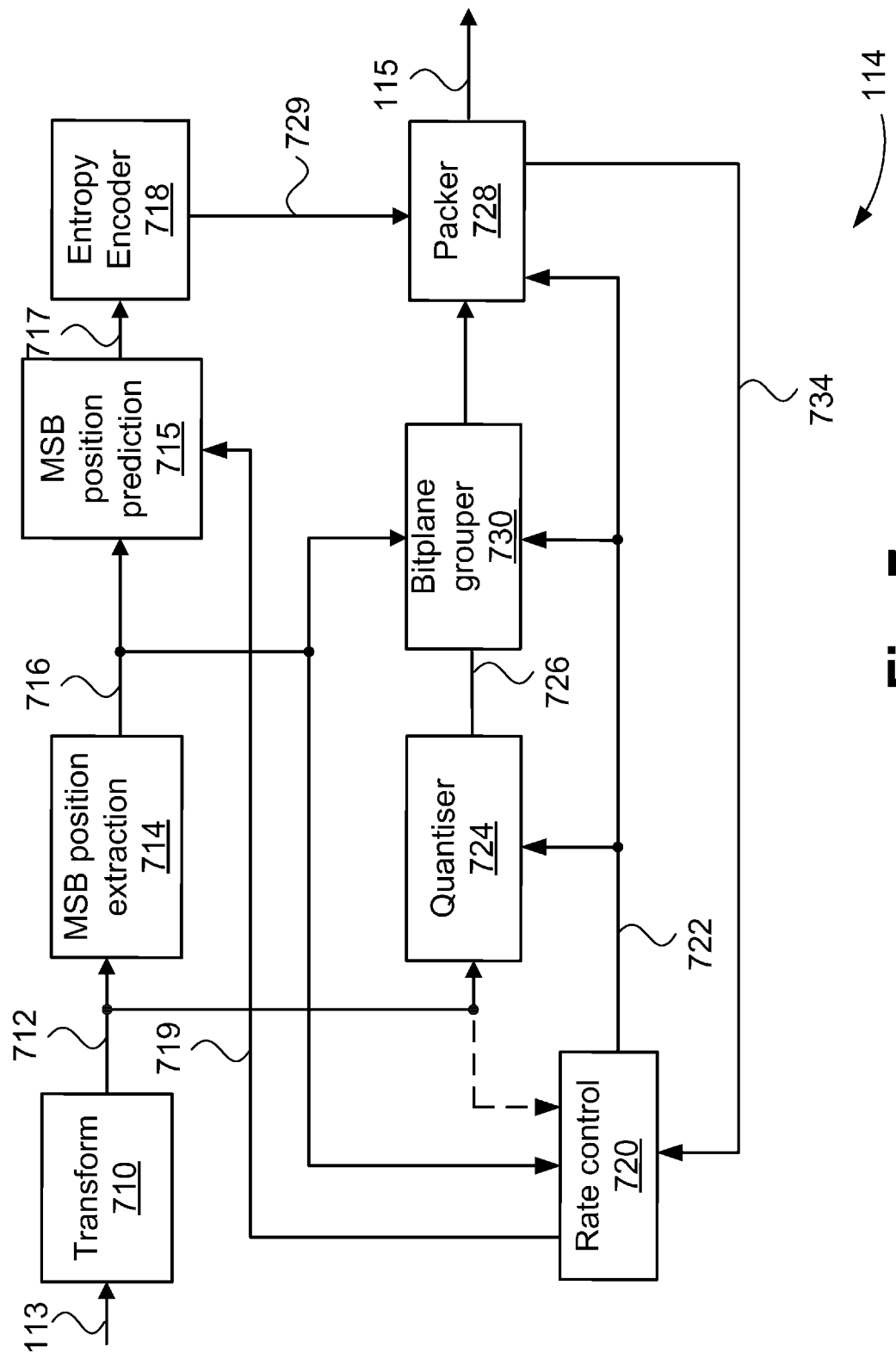
FIG. 7 is a schematic block diagram showing functional modules of a video encoder.

FIG. 7 is a schematic block diagram showing functional modules of the video encoder 114. The video encoder 114 may be implemented using a general-purpose computer system 200, as shown in FIGS. 2A and 2B, where the various functional modules of the video encoder 114 may be implemented by dedicated hardware within the computer system 200. Alternatively, the various functional modules of the encoder 114 may be implemented by software executable within the computer system 200 such as one or more software code modules of the software application program 233 resident on the hard disk drive 205 and being controlled in its execution by the processor 205. In another alternative, the various functional modules of the encoder 114 may be implemented by a combination of dedicated hardware and software executable within the computer system 200. The video encoder 114 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular, the video encoder 114 comprises modules 710-730, which may each be implemented as one or more software code modules of the software application program 233, or an FPGA 'bitstream file' that configures internal logic blocks in the FPGA to realise the video encoder 114. The video encoder 114 provides reduced complexity in the rate allocation functionality by approximating costs for evaluation of candidate truncation levels, such that a worst case estimate is used for each candidate during evaluation. Then, for coding, the actual coded cost is derived once, only at the selected truncation level that is applied for coding.

Although the video encoder 114 of FIG. 7 is an example of a low latency video encoder, other video codecs may also be used to perform the processing stages described herein. The video encoder 114 receives video data 113, such as a series of frames from the video source 112, each frame including one or more colour channels.

A transform module 710 receives the uncompressed video data 113 from the video source 112 and performs a hierarchical wavelet forward (or 'analysis') transform using a set of analysis filter banks. Generally, a 5/3 Le Gall wavelet is used, although other wavelets are also possible, such as a Haar wavelet or a Cohen-Daubechies-Feauveau 9/7 wavelet. The transform module 710 produces wavelet coefficients 712. The wavelet coefficients 712 are grouped into subbands according to a wavelet decomposition structure, as described with reference to FIGS. 3A and 3B. Due to the requirement of ultra-low latency, the number of levels of decompositions is highly constrained vertically, generally to not more than two levels. The number of levels of decompositions is relatively unconstrained horizontally, e.g. with five levels being used. Considering the case of one level of vertical decomposition, within each subband is a set of coefficients arranged as an array of one in height and n coefficients in width. The arrangement of coefficients as an array of one in height and n coefficients in width may be considered a list, and contrasts with the typical usage in codecs such as JPEG2000, where the coefficients in each subband are generally a square-shaped array. The list of coefficients within each subband may then be scanned. However, firstly a grouping operation is applied, where each subband is divided into a set of equal-sized groups of coefficients for the purpose of entropy coding. Although various group sizes may be used, and group size need not be constant across all subbands, a fixed group size of four for all subbands provides good performance of the encoder 114 under a variety of test data. Thus, the transform module 710 produces grouped coefficients 712.

Secondly, the grouped coefficients in each subband are further divided into columns. The column boundaries are aligned such that a coefficient group at the deepest Wavelet decompositional depth of five is wholly contained within a column (i.e. $2^5 \times 4 = 128$ pixel granularity). As such, each coefficient group is wholly contained within one column.

The grouped coefficients 712 are passed to a greatest coded line index (MSB position) extraction module 714. The grouped coefficients 712 are to be coded as a series of bitplanes (or 'lines'), where bit 'n' of each coefficient within the group is coded as a unit of four bits. Firstly, the bitplane index of the high bitplane containing a nonzero bit of any of the coefficients within a coefficient group is determined. The bitplane index is referred to as a MSB position. Collectively (i.e. across all coefficient groups and subbands), the indices form the MSB positions 716. The MSB positions 716 are passed to a rate control module 720. Also shown in FIG. 7 are the grouped coefficients 712, which may optionally by passed to the rate control module 720, as described further with reference to FIG. 8. The rate control module 720 determines, among other things, MSB position prediction modes 719 and rate control parameters 722, each determined on a per-column basis. The MSB positions 716 and the MSB position prediction modes 719 are passed to a MSB position prediction module 715, where the MSB position prediction modes 719 are applied to the MSB positions over all subbands in the precinct, with a separate prediction mode per column. Available prediction modes include horizontal, vertical and raw (no prediction). As a result of MSB position prediction, MSB position delta values 717 are produced, enabling the MSB position of a later coefficient group to be predicted from the MSB position of an earlier coefficient group. Coefficient groups having no predictor (e.g. the leftmost coefficient group in a column for horizontal prediction) are coded as 'raw' (i.e. using a 4-bit codeword). The MSB position prediction modes 719 are coded in the encoded bitstream 115 in the precinct header 604 and the MSB position delta values 717 are passed to an entropy encoder module 718 for coding into the encoded bitstream 115 in the MSB position block 642 for the respective column. The MSB position prediction module 715 also produces a MSB position coding cost 727, indicative of the bit cost of coding the MSB position delta values 717. The described representation of coefficients groups within a subband as a set of bitplanes is further described below with reference to FIG. 4.

The bit budget for a precinct may be divided amongst the columns of the precinct, with each column having independent quantisation control via separate rate parameters (e.g. scenario and refinement) within the rate parameters 722. For each column in a precinct, the rate control module 720 determines a scenario and refinement using a bit budget for the considered column.

The quantiser module 724 quantises wavelet coefficients from each coefficient group of each subband using the rate control parameters 722 (i.e. the scenario and the refinement for the subband). A truncation level for coefficients in a subband is set by the scenario and refinement, and may also be referred to as the 'greatest truncated line index' (GTLI). Prior to truncating coefficients according to the final GTLI, a rounding offset is applied to facilitate reconstruction in the video decoder 134. Generally, uniform rounding provides good performance at low complexity. As such, the rounding offset is defined such that rounding is biased towards a downward direction (reduction in magnitude), preventing the possibility to increase the MSB position for a group of coefficients. The described MSB positions are determined prior to quantisation and thus cannot be altered according any rounding that takes place at the selected truncation level. Finally, truncated coefficient groups 726 are output to a bitplane grouper module 730.

The bitplane grouper module 730 assembles 4-bit words such that one bit at position n of each of the four coefficients within a coefficient group are grouped together. For each coefficient group, the value n proceeds from that of the MSB position for the coefficient group down to the applicable GTLI, resulting in a sequence of 4-bit words. The resulting 4-bit words are passed to a packer module 728 for writing (or 'packing') into the encoded bitstream 115.

The entropy encoder module 718 encodes the MSB positions deltas 717 and the MSB position prediction mode 719. The resulting variable-length codes 729 are passed to the packer module 728 for packing into the encoded bitstream 115. For multi-column operation, the entropy encoder module 718 may be duplicated, with up to one instance per column present. As such, the sequential parsing requirements in individual instances of the entropy encoder module 718 is constrained to the column bitrate. Moreover, each instance of the entropy encoder module 718 produces an independent sequence of variable-length codes 729, which are buffered prior to sequential delivery to the packer module 115, which produces a single bitstream for all columns of the precincts. Each run of the variable-length codes 729 terminates with a 4-bit alignment operation. Several modes for predicting the MSB position values are available, with the selected mode being applied to all coefficient groups over all subbands within the precinct. Examples of MSB position prediction mode include horizontal prediction, where the predictor is the left neighbouring coefficient group within a subband, and vertical prediction, where the predictor is the above neighbouring coefficient group (i.e. the coefficient group in the corresponding subband from the above precinct).

A 'raw' mode is also available, where the MSB position value for each coefficient is coded, with no predictor used. For the coefficient group having no predictor, such as the leftmost coefficient group in a column when horizontal prediction is used, the coefficient group having no predictor is also raw coded. As the number of coefficient groups is known from the chosen wavelet decomposition and the precinct dimensions, the MSB positions 716 are coded using a series of unary coded magnitudes of the MSB position delta, and including an additional bit for the sign of the MSB position delta. The resulting set of coded MSB position deltas 717 is written to the encoded bitstream 115 using a unary code and a sign bit for each value.

The packer module 728 packs data, including the bitplanes to be coded from each coefficient groups into the encoded bitstream 115. For each coefficient group, bitplanes from the indicated MSB position down to the modified GTLI are packed into the encoded bitstream 115. For cases where the modified GTLI has been increased beyond the GTLI as indicated by the scenario from the rate control parameters 722, a reduced coding cost for coefficient bitplane data results. The rate control module 720 has already taken the reduced coding cost into account and may have selected additional subbands for refinement, or selected a higher scenario, as a result of the bit rate saving. Also, the packer module 728 packs sign bits, with one bit packed per significant coefficient into sign block 646, with one such block per subpacket of each precinct. The sign bits are packed in the same order as the coefficient data is packed (i.e. for the subbands contained in the subpacket group). Finally, after writing the sign bits, alignment to a 4-bit boundary is performed, matching the granularity of operation of the packer module 728. As each subpacket is written, the packer module 728 maintains a count of the length of each of the component data blocks, resulting in the production of a coded cost 734. The coded cost 734 is passed to the rate control module 720. The coded cost 734 may also be determined prior to the packing operation. For example, the entropy encoder 718 may determine the MSB position coding cost contribution to the final coded cost 734.

The bitplane grouper 730 may determine the coefficient data bit cost contribution to the final coded cost 734. The quantiser 724 may determine the significance of each coefficient and thus the sign block cost contribution to the final coded cost 734. Such earlier derivation reduces the timing constraint on the determination of the coded cost 734, which may otherwise lead to delay in the input needed for the rate control module 720 to proceed to the next precinct. Finally, each column has a separate coded cost 734 value.

The resulting encoded bitstream 115 is passed to the video decoder 134 as a received bitstream 133 via the transmitter 116, the communications channel 120, and the receiver 132. The resulting encoded bitstream 115 may also be stored in the non-transitory storage 122, which may exist in addition to, or instead of, or as part of, the communications channel 120.

Figure 8:
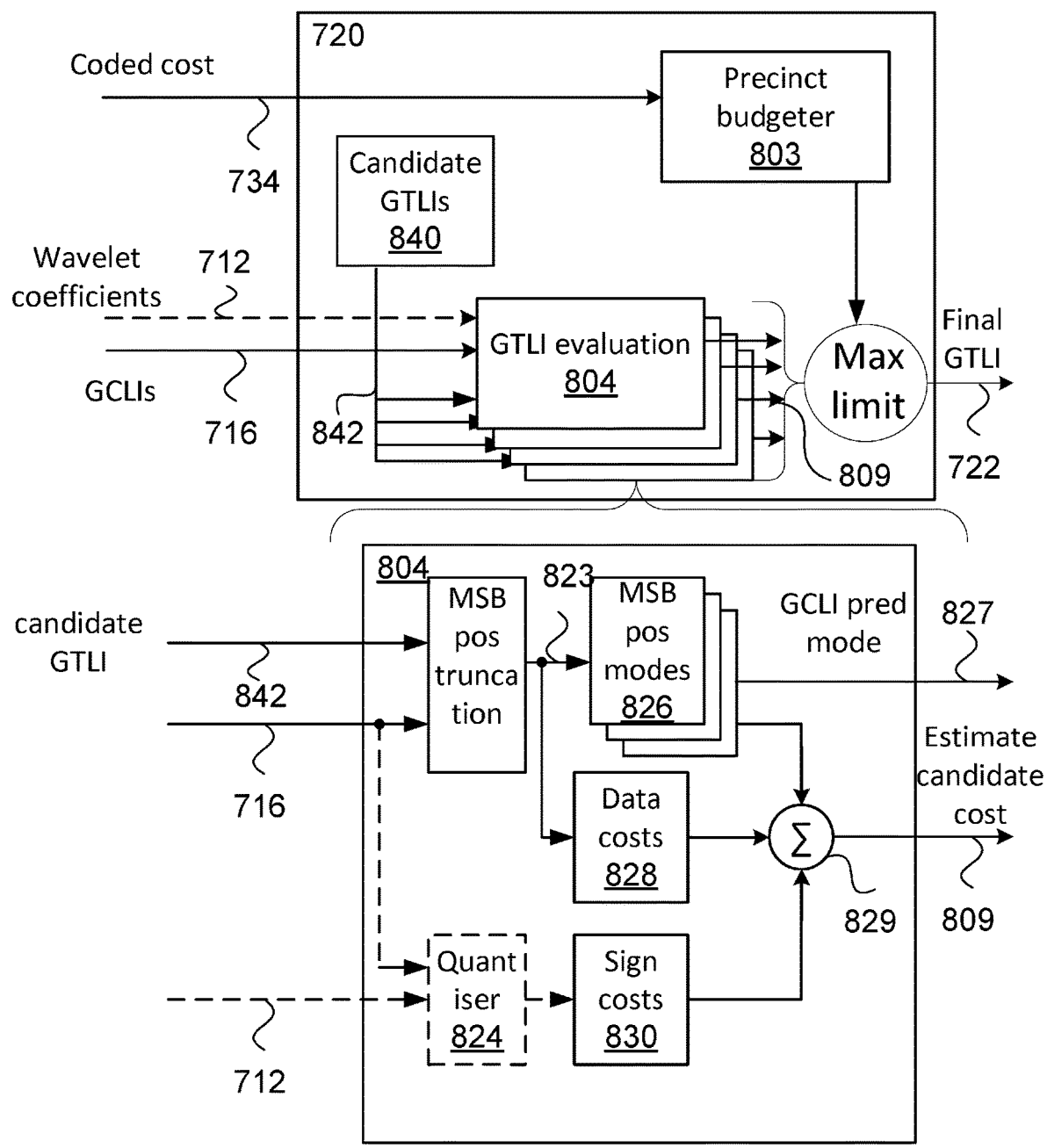
FIG. 8 is a schematic block diagram showing the rate control module of the video encoder of FIG. 7.

FIG. 8 is a schematic block diagram showing the rate control module 720 of the video encoder 114 of FIG. 7. The rate control module 720 is realised with reduced complexity by use of an approximation of the coding cost for selection of the rate control parameters for each column, i.e. the scenario and refinement. A precinct budgeter 803 receives the coded cost 734 for a previous precinct in order to determine an allowed budget for a current precinct. Based upon the configured constant bit rate, a per-precinct budget is established. However, constraining each precinct to consume no more than the per-precinct budget is overly constraining, leading to poor visual quality. On the other hand, the low latency operational requirement imposes constraints on allowable degree of underuse or overuse of the per-precinct budget. For each frame, a cumulative count of the bits consumed so far in encoding the frame is maintained, along with a cumulative target bit consumption for precincts up to the current precinct. From this, a budget for the current precinct is derived. The cumulative count of consumed bits is updated using the coded cost 734, as opposed to an cost derived from within the rate control module 720, for example, by one of several available GTLI evaluation modules 804. As such, it is possible for the GTLI evaluation modules 804 to produce an approximate of the resulting coded cost 734, as determined when the selected rate parameters are applied for coding the precinct.

The GTLI evaluation modules 804 evaluate a plurality of rate control parameters, producing a candidate cost estimate for each set of evaluated parameters. For example, each scenario may be evaluated. Each GTLI evaluation module produces an estimate candidate cost (e.g. 809). Of the plurality of resulting estimate candidate costs, all scenarios associated with costs exceeding the precinct budget are excluded from further consideration. Then, the scenario associated with the highest remaining estimate candidate cost is selected. Then, a plurality of refinements are tested, with the added cost in addition to the estimate candidate cost of the selected scenario. Again, refinement values that would result in a total estimate cost exceeding the precinct budget are excluded from further consideration. Of the remaining refinement values, the refinement value associated with the highest estimated cost is selected (i.e. the greatest number of subbands having their truncation level lowered by one but, corresponding to an additional coded refinement bit). Thus, the rate control parameters 722 (i.e. scenario and refinement) for the precinct are determined. To produce a valid bitstream, the coded cost 734 resulting from application of the selected scenario and refinement does not exceed the precinct budget. Therefore, the estimated candidate costs are a 'worst case' estimate (i.e. the coded cost 734 is less than or equal to the estimated cost).

Use of an estimate candidate cost (e.g. 809) in determining the rate control parameters 722 enables the rate control module 720 to be realised with reduced complexity, compared to determining the actual costs involved. In particular, the GTLI evaluation modules 804 determine coefficient coding costs at a plurality of scenarios and refinements. Coefficient coding costs include MSB position coding costs, coefficient data costs and sign costs. The MSB position coding costs may be the costs after truncation of the MSB positions to the truncation level for the subband. In particular, untruncated MSB positions may include values below the truncation level. As no data would be coded for such coefficient groups, it is not necessary to signal the degree to which the MSB position falls below the truncation level. Then, the MSB positions may themselves be truncated to the truncation level, generally resulting in runs of coefficient groups for which no coefficient data bits are coded. The MSB positions 716 are input to the rate control module 720 and, for each candidate GTLI, a truncation operation is applied to produce truncated MSB positions 823. As the truncation level is raised, a greater proportion of the coefficient groups have no coefficient bitplanes to be coded, and thus runs of uncoded coefficients become more prevalent at higher truncation levels.

Then, a MSB position prediction module 826 selects a MSB position prediction mode 827 for the truncated MSB positions 823, being the MSB position prediction mode resulting in minimised MSB position coding cost. The MSB position coding cost is passed to a summation module 829. Thus, the coding cost of MSB positions is determined after truncation to the truncation level resulting from the scenario and refinement. Using the truncated MSB positions 823, a data costs module 828 produces a data cost for the coefficient bitplanes, which is also passed to the summation module 829. Then, a sign costs module 830 introduces sign costs at one sign bit per coded coefficient (without testing quantisation at the candidate truncation level), making an implicit assumption that each coefficient is significant. This represents a worst-case for the sign block 646. As such, the resulting estimate candidate cost 809 is a worst-case estimate of the coded cost 734.

To determine the coded cost (e.g. 734) for each of the candidate truncation levels, a quantiser module 824 would be required for each candidate truncation level. Each quantiser module 824 would perform the same operation as the quantiser 724. However, the replication of functionality of the module 824 and quantiser 724 to test each candidate truncation level imposes a large complexity increase on the video encoder 114. As a result of the omission of the quantiser 824 from the GTLI evaluation modules 804 complexity is reduced, at the consequence that the scenario and refinement are decided based upon an approximation of the resulting cost, being less than or equal to the coded cost. The omission of the quantiser 824 from the GTLI evaluation modules 804 would lead to an undesirable under-consumption of bits, and consequent quality degradation. However the precinct budgeter 803 receives the coded cost 734 from the packer 728, instead of using the cost from the GTLI evaluation modules 804 associated with the selected scenario and refinement. Then, the unused bitrate for the current precinct is forwarded to the next precinct by way of adding the coded cost 734 to the consumed bit count instead of the relevant candidate cost 809 from the GTI evaluation modules 804. As a consequence, the next precinct is able to select a lower truncation level than would otherwise be the case. Omitting the cost of some portion of the coded syntax elements from each of the estimated candidate costs 809 should result in some change to decisions made by the rate control module 720.

As described above, the rate-forwarding behaviour of the precinct budgeter 803 results in little impact over the entirety of each frame in terms of unusable bits. Experiments showed that the described scheme resulted in very limited impact for PSNR, within 0.01 dB for a variety of tested images at bitrates ranging from 3-14 BPP. The limited impact for PSNR is due to the-rate forwarding leading to almost no overall reduction in available bits allocated to coding Wavelet coefficients. The sign bits, when considering nearby truncation levels, provide a relatively unvarying contribution to consumed bits. At low truncation levels, many significant coefficients are present and so the coded cost 734 is close to the estimated candidate cost (where each coefficient is assumed to be significant). At higher truncation levels, few significant coefficients are present and so the estimated candidate cost at such levels is lower than the coded cost, by up to one bit per coefficient. Between adjacent truncation levels, the change in the number of significant coefficients is generally not large. In combination with the rate forwarding behaviour, the rate control module 720 is able to make similar decisions to the case where the correct cost was being evaluated in each of the GTLI evaluation modules 804.

Figure 9:
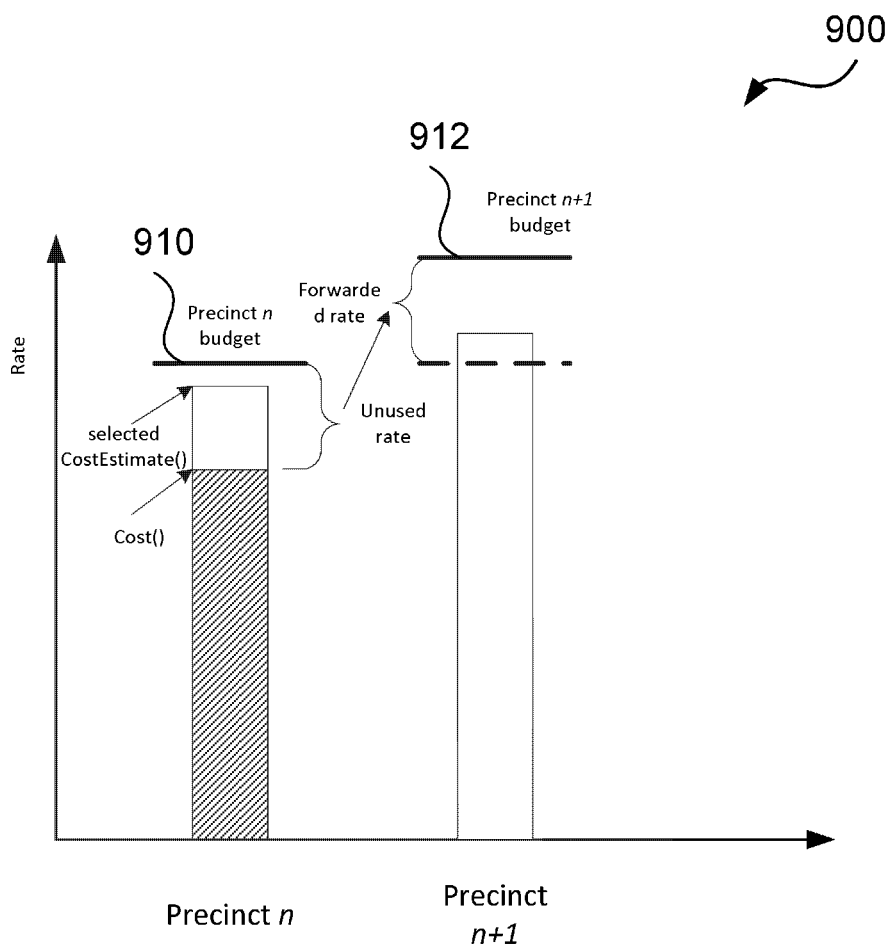
FIG. 9 is a schematic diagram showing rate forwarding based on cost estimation in the video encoder of FIG. 7.

FIG. 9 is a schematic diagram 900 showing rate forwarding based on cost estimation in the video encoder 114 of FIG. 7. FIG. 9 further illustrates the behaviour discussed with reference to FIG. 8. FIG. 9 shows two spatially adjacent precincts in a frame, precinct n and precinct n+1. Precinct n is allocated a budget 910. The rate control module 720 selects a scenario and refinement that results in consumption of rate as shown by CostEstimate( ) in FIG. 9. Any further lowering of the truncation level and consequent coding of any additional bitplanes results in exceeding the budget 910. When the video encoder 114 encodes the precinct according to the selected scenario and refinement, Cost( ) bits are written to the encoded bitstream 115. Then, in the precinct budgeter 803, the budget 912 for precinct n+1 is determined by adding the unused rate from the precinct n to the per-precinct rate target for the frame. Then, when coding the precinct n+1, the rate control module 720 is able to select a lower truncation level than would otherwise be the case. The first precinct of the frame may be expected to be coded at slightly reduced quality compared to subsequent precincts in the frame, as the first precinct in the frame does not benefit from receipt of forwarded rate from any earlier precincts. One method of mitigating the reduced quality of the first precinct in the frame is to adjust the per-precinct budget such that the first precinct in the frame is allocated a higher budget than subsequent precincts in the frame.

Although the example of FIG. 9 describes operation at a precinct level, the example of FIG. 9 is also applicable to each of the independent columns of a precinct using a columnar arrangement for increased entropy coding throughput.

Figure 10:
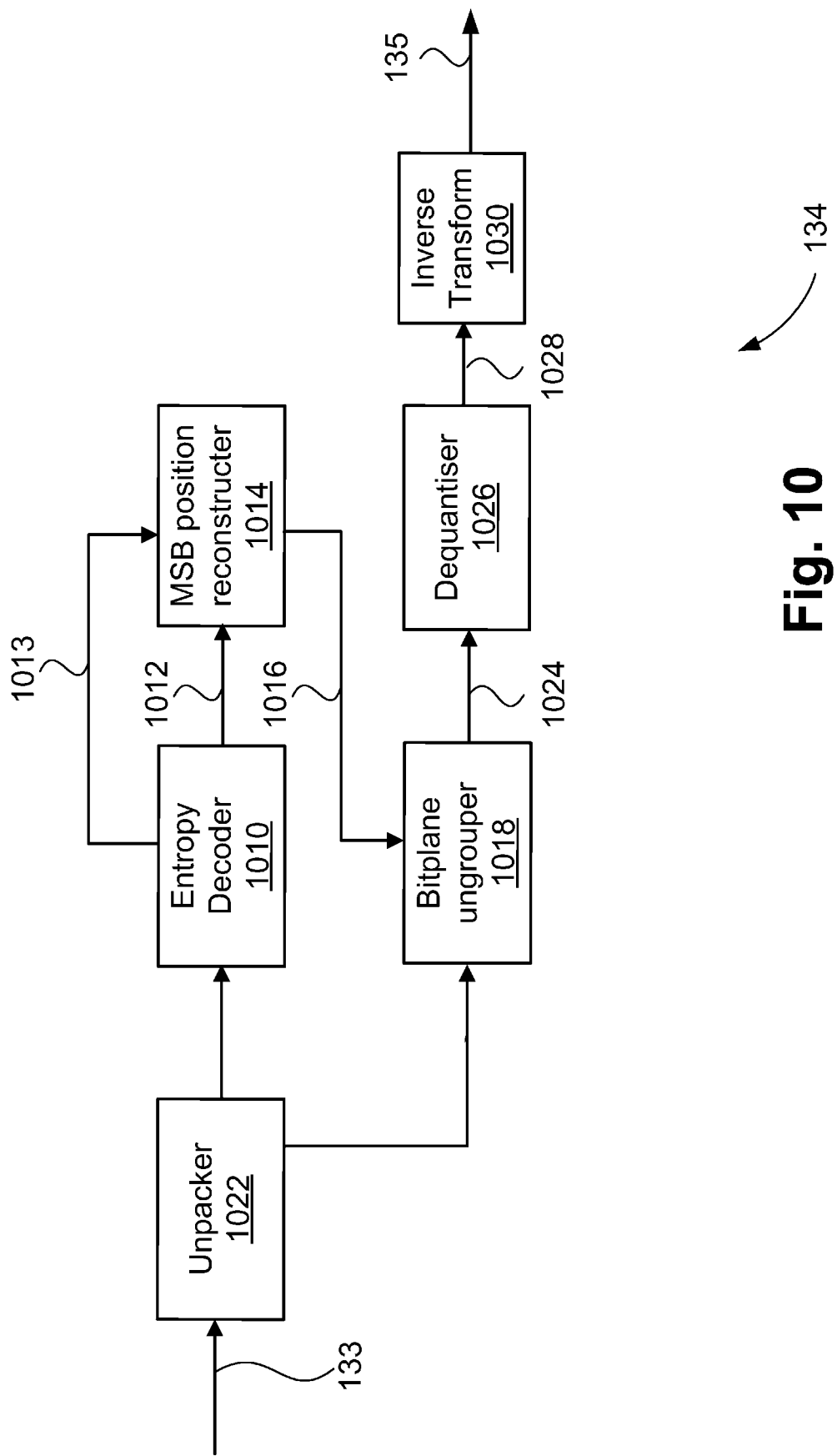
FIG. 10 is a schematic block diagram showing functional modules of a video decoder.

FIG. 10 is a schematic block diagram showing functional modules of the video decoder 134. The video decoder 134 may be implemented using a general-purpose computer system 200, as shown in FIGS. 2A and 2B, where the various functional modules may be implemented by dedicated hardware within the computer system 200. Alternatively, the various functional modules of the decoder 134 may be implemented by software executable within the computer system 200 such as one or more software code modules of the software application program 233 resident on the hard disk drive 205 and being controlled in its execution by the processor 205. In another alternative, the various functional modules of the decoder 134 may be implemented by a combination of dedicated hardware and software executable within the computer system 200. The video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories.

An unpacker 1022 receives the received bitstream 133. Firstly, a frame header is decoded that signals items including the frame dimensions and the coded precinct size. From the frame dimensions and the coded precinct size, the precincts are then decoded. For each precinct the scenario and refinement, as determined by the rate control module 720, are decoded from the received bitstream 133. From the determined scenario and refinement, the remaining coded structure of the precinct can be determined.

The entropy decoder module 1010 decodes delta MSB position values 1012 from MSB position blocks (e.g. 642) and a MSB position prediction mode 1013, which are passed to a MSB position reconstructor module 1014. The MSB position reconstructor module 1014 reconstructs MSB position values 1016 according to a MSB position prediction mode 1013 for the precinct, which is also obtained from the received bitstream 133. With the MSB position values 1016, a bitplane ungrouper 1018 operates to extract bitplanes for the coefficient groups for the subbands in the precinct as quantised coefficients 1024 by consuming successive 4-bit words from the unpacker 1022 and reassembling quantised coefficients 1024.

A dequantiser module 1026 performs inverse quantisation on the quantised coefficients 1024 to produce wavelet coefficients 1028. The inverse quantisation operation involves applying a suitable reconstruction offset, the reconstruction offset determined according to the GTLI for the subband, modified for each coefficient group in the subband according to a corresponding offset from the offset table 1020. Then, an inverse transform module 1030 applies a synthesis wavelet filter bank to the wavelet coefficients 1028 to produce decoded video 135.

FIG. 11 is a schematic flow diagram showing a method 1100 of encoding a bitstream with a cost estimation for the coded precinct cost used to derive the rate control parameters 722. The method 1100 results in an encoded bitstream 115 having a reduction in the cost of the coded data for a precinct compared to the cost anticipated in the rate control module 720.

As described below, the method 1100 is performed by one or more of the functional modules of the video encoder 114. As described above, in one arrangement the video encoder 114 may be implemented as such as one or more software code modules of the software application program 233 resident on the hard disk drive 205 and being controlled in its execution by the processor 205. The video encoder 114 using estimated coding costs by performing the method 1100 has reduced complexity compared to computation of the correct coding costs for each truncation level under evaluation.

The method 1100 begins at a determine current precinct budget step 1102. At the determine current precinct budget step 1102, the precinct budgeter 803, under control of the processor 205, determines a budget for each column of the current precinct. The budget is determined by taking unused rate from the corresponding column of the previous precinct and adding the a constant per-column per-precinct budget. For the first precinct of the frame, there is no previous precinct from which rate can be inherited. Then, a constant quantity of rate can be allocated to the first precinct, in addition to the amount of rate allocated in accordance with the configured bits-per-pixel of the video encoder 114 (possibly attenuated from a rate control look-ahead operation). As no prior information is available to set this constant rate beyond the rate control look-ahead operation, a predetermined constant amount should be used.

For example, experimental results on various test images indicate that, on average, 15% of Wavelet coefficients groups contain coefficients that remain significant after truncation to levels typical for relatively noise-free video data. Then, for 85% of coefficients groups (the 'uncoded coefficient groups' described with reference to FIG. 4), the estimated cost includes a sign bit that will not be coded. For a precinct in a 4K UHD frame, at 6 bpp, ignoring the impact of the rate control lookahead window, the targeted compressed size is 3840 (width)×2 (precinct height)×6 bpp=46080 bits. Then, for a budgeting step that assumes every coded coefficient will be significant when it is expected that only 15% of coefficient groups will be coded, and within these, 25% of the coefficients will become insignificant after quantisation. Then, the budget may be increased by 3840×2×3 (number of coefficients in the precinct, with three colour channels)×15% 25%=864 bits for the first precinct. This increase is based on the rate control module 720 assuming that no sign bit is absent, when some will be not be coded by the packer module 728 (e.g. 440). Then, the budget may be set to 46080+864=46944 bits. This level is set with an expectation that the finally consumed quantity of bits for the precinct will be closer to 46080 bits due to a large number of coded coefficients that will be quantised to zero when coded at the selected truncation level, and thus will have no associated sign bit. As seen in this example, sign bit costs have a degree of impact on the budgeting process. Specific statistics are highly image dependent, so in practice the above calculation for extra rate, which amounts to approximately a 1.875% increase over the budget resulting from the BPP value and precinct size, may be determined using assumptions of coefficient statistics that are reflective of video data expected to be encountered by the video encoder 114.

Calculating the exact coded cost in the rate allocation for the first precinct is possible, but then no rate will be available to forward to the next precinct, so the issue of lack of forwarded rate is simply pushed to the next precinct. As such, provision of some extra rate for the first precinct is preferable. Moreover, calculating full coded cost for the first precinct (at every truncation level for the decision process) increases the cost in an assymetric way, i.e. for the first precinct only. Such an increase could be accommodated with extra hardware just for the first precinct, or slower processing of the first precinct (introducing latency later in the frame). Both solutions are undesirable, negating the benefit of the consistent complexity reduction over all precincts that would otherwise be achieved. Such a consistent reduction is preferable for hardware design because this also reduces the 'worst case', for which hardware must always be provisioned. Alternatively, when a rate control look-ahead window is in use, the budget for the first precinct is set in proportion to the estimated cost of the first precinct compared to the next n precincts, where n is the size of the look-ahead window in precincts. The per-precinct budget is the bits-per-pixel multiplied by the number of pixels in one precinct. The per-precinct budget is further divided amongst the columns in the precinct according to the relative proportion each column occupies within a precinct. The budget determined at step 1102 may be stored in the memory 206. Control in the processor 205 then passes to a generate truncation levels step 1104.

At the generate truncation levels step 1104, the candidate GTLIs module 840 within rate control module 720, under control of the processor 205, generates a plurality of candidate truncation levels 842 which may be stored in the memory 206. A candidate truncation level may be specified as a scenario. Alternatively, given a scenario, a candidate truncation level may be specified as a refinement (relative to the scenario). Every possible truncation level may be generated and evaluated, enabling selection of the optimal truncation level regardless of the input video data. The number of possible truncation levels is equal to the number of bits afforded to Wavelet coefficients for the system 100, generally sixteen (16) bits, resulting in sixteen (16) possible truncation levels. Control in the processor 205 then passes to a generate cost estimates step 1106.

At the generate cost estimates step 1106, the GTLI evaluation modules 804, under control of the processor 205, produce one cost estimate for each of the candidate truncation levels 842, resulting in a set of cost estimates (e.g. 809). The set of cost estimates may be stored in the memory 206. The cost estimate is derived from the MSB positions and the truncation level candidate. As such, no sign bits are assumed to be coded for uncoded coefficient groups. However, for coded coefficient groups, every coefficient is assumed to be significant regardless of the truncation level. As a consequence, any sign bits (e.g. 440) that will not be coded are included in the generated cost estimate. Control in the processor 205 then passes to a prune excessive cost estimates step 1108.

At the prune excessive cost estimates step 1108, each candidate estimated cost is compared, under execution of the processor 205, and the costs that exceed the budget from step 1102 are discarded. Step 1108 is performed independently for each column in the precinct. Control in the processor 205 then passes to a select remaining cost estimate step 1110.

At the select remaining cost estimate step 1110, the highest cost estimate of the cost estimates remaining after the step 1108 are selected under execution of the processor 205. Due to the previous step 1108, the cost estimate selected at step 1110 is under the budget and thus usable for coding while obeying the buffer constraints. Being the highest cost (lowest truncation point) the quality seen at the video decoder 114 is maximised for the each column. Then, the scenario and refinement associated with the selected cost estimate is selected for use in coding the precinct. Control in the processor 205 then passes to an encode precinct header step 1112.

When multiple columns are in use, the steps 1102 to 1110 are performed independently for each column. Note that in determining the current precinct budget at tine step 1102, the budget for each column is obtained by allocating the overall budget to the precinct in proportion to the faction of the column width vs the frame width. As such, the budget forwarding from the previous row of precincts is available to all columns in the current row of precincts.

At the encode precinct header step 1112, the precinct header (e.g. 604) is stored in the encoded bitstream 115 under execution of the processor 205. When the video encoder 114 is configured to use multiple columns, a separate precinct header is stored for each column. Each precinct header includes the quantisation parameters for the respective column. Control in the processor 205 then passes out an encode precinct data step 1113.

At the encode precinct data step 1113, coefficient data for each column of the precinct is encoded using the quantiser 724, the bitplane grouper 730, the entropy encoder 718, and the packer 728, as described with reference to FIG. 7. In parallel implementations, separate instances of the modules 724, 730, 718, and 728, may be used. As a result, a coded cost 734 is generated for each column in the precinct. The coded cost 734 includes only the cost of sign bits that are coded at the selected truncation level. As a consequence, the sign bit 440 is omitted from the coded cost 734. Alternatively, the coded cost 734 may be viewed as indicative of the sum of coding all columns within each precinct. The coded cost 734 is passed back to the rate control module 720, under execution of the processor 205. Control in the processor 205 then passes to a pad bitstream step 1114.

At the pad bitstream step 1114, the encoded bitstream 113 is padded with extra filter data to avoid underflow of the leaky bucket model used to supply data to the communications channel 120. The leaky bucket model facilitates supply of data to the communications channel 120 at a constant bit-rate from the variable rate of data production as each column of each precinct is coded. If, even with very low truncation levels (and consequent large amounts of coefficient data), it is still the case that insufficient data is produced by the packer 728, then the potential for buffer underflow exists. The potential buffer underflow is avoided by insertion of padding data. One padding insertion operation happens per precinct, with zero or more 4-bit words of padding data inserted. As such, padding across all columns is coalesced into one padding block (if present) per precinct. The method 1100 differs from a multi-core approach where several instances of the video encoder 134 operate in a tiled fashion on a larger frame of video data. In such multi-core approaches, each instance has separated padding, potentially resulting in less efficient usage of the available bitrate. Padding is signalled by the precinct length field, with a length value that exceeds the coded length of the precinct indicative of the presence of padding. The method 1100 then terminates following step 1114.

In one arrangement of the method 1100, complexity of the video encoder 114 is further reduced by reducing the number of candidate truncation levels generated by the candidate GTLIs module 840 at the step 1104. Instead of generating every possible truncation level, a subset of the possible truncation levels is generated. To guarantee operation even with degenerate input data, such as white noise, some very high truncation level(s) are needed. Such high truncation levels result in poor visual quality and are only present to ensure guaranteed constant bitrate operation. Other truncation levels may be based on the truncation levels from the previous precinct. For example, a limited set of truncation levels ranging above and below the selected truncation level of the previous precinct may be tested. In the majority of cases, the selected truncation level would lie within the range of truncation levels when the full set of truncation levels is evaluated, so little coding efficiency impact is seen by searching the reduced set of truncation levels. The arrangement where a subset of the possible truncation levels is generated reduces the complexity of the video encoder 114 by reducing the required quantity of GTLI evaluation modules 804.

FIG. 12 is a schematic flow diagram showing a method 1200 of decoding a received bitstream 133 having precincts arranged in multiple columns. As described below, the method 1200 is performed by one or more of the functional modules of the video decoder 134. As described above, in one arrangement, the video decoder 134 may be implemented as one or more software code modules of the software application program 233 resident on the hard disk drive 205 and being controlled in its execution by the processor 205.

The method 1200 begins at a decode frame header step 1202. At the decode frame header step 1202, the unpacker 1022, under control of the processor 205, decodes frame header syntax elements from the received bitstream 133 by unpacking the frame header syntax elements. The frame header syntax elements include signalling indicating the number of columns per precinct. The signalling may be explicit or implicit.

Explicit signalling includes syntax elements signalling the number of columns and the column boundaries, with precision signalled at the granularity of the column boundary, (e.g., one twenty eight (128) pixels when five (5) horizontal wavelet decomposition levels are used).

Implicit signalling relies upon an a priori constraint on the processing capacity of each entropy decoder 1010. For example, a one-column approach is possible for operation at UHD 4K at 60 frames per second. If the frame resolution is indicated to be 8K at the same frame rate, the pixel rate is four times that of the 4K case. Then, the number of columns is implied to be four, with each column constrained to not exceed the bitrate seen in the 4K case.

Control in the processor 205 then passes from step 1202 to a decode precinct header step 1204.

At the decode precinct header step 1204, the unpacker 1022, under control of the processor 205, decodes the precinct header (e.g. 604) by unpacking the precinct header. The precinct header includes an offset table signalling the start location of each subpacket within each subpacket group in the precinct. The offset table enables parallel parsing of each subpacket to commence. When multiple columns are in use, the decode precinct header step 1204 decodes a separate precinct header for each column in the row of precincts. Control in the processor 205 then passes to a decode column subpackets step 1206.

At the decode column subpackets step 1206, one or more of the entropy decoders 1010, under control of the processor 205, decode the MSB position block (e.g. 642) associated with each column, respectively. For each column, the corresponding MSB position block is decoded. The decoding operations performed at step 1206 occur in parallel, generally using hardware resources due to the high required throughput. The decoding operations require the unpacker 1022 to concurrently extract each MSB position block from the subpackets associated with each column. In addition to parallel parsing of MSB position blocks, the associated data block and sign block may also be parsed in parallel and quantised coefficients dequantised in parallel to produce decoded wavelet coefficients (i.e. 1028). Control in the processor 205 then passes to a wavelet synthesis filter step 1208.

At the wavelet synthesis filter step 1208, the inverse transform 1030, under control of the processor 205, performs a wavelet synthesis filter operation on the decoded wavelet coefficients to produce decoded video data 135. The method 1200 then terminates following step 1208.

In an arrangement of the system 100, the three colour components are each assigned separate subpackets (e.g. 620, 622, 624), with each subpacket spanning the entirety of the frame. As such, separate rate control parameters may be present for each colour channel, as mandated by the need for the bitrate of each colour component to be independently controllable and to achieve constant bitrate operation for each of the colour components. An arrangement where the three colour components are each assigned separate subpackets generally uses three entropy encoders and three rate control modules in the video encoder 114 and three entropy decoders in the video decoder 134. Each of the three entropy encoders and three rate control modules in the video encoder 114 and the three entropy decoders in the video decoder 134 have a capacity at least matching the constant bitrate of the associated colour component.

In another arrangement of the method 1100, the rate control module 720 operates such that after selection of the rate control parameters 722 (i.e. truncation level and refinement) using estimated costs, the cost calculation is performed again just for the final selected rate control parameters. For example, the quantiser 824 is used to assist the sign costs 830 by performing quantisation at the selected truncation level for each subband. Thus, an accurate final cost for coding the precinct is obtained. As a consequence, there is no feedback loop from the packer module 728 in supplying the coded cost 734 back to the rate control module 720 at step 1113. The arrangement retains the property of selection the rate control parameters 720 on a worst case estimate of the cost for each considered truncation level. Removal of the feedback loop is suitable in some implementations where the feedback loop from the packer module 728 to the rate control module 720 may introduce delay into the design. The cost of removing the feedback loop is however the need to perform a quantisation step for one truncation level (i.e. using one instance of the quantiser 824) for the purpose of determining the coded cost 734 prior to encoding the quantised coefficients.

INDUSTRIAL APPLICABILITY

The arrangements described are applicable to the computer and data processing industries and particularly for the digital signal processing for the encoding a decoding of signals such as video signals for a low-latency (sub-frame) video coding system.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:
1. A method of decoding a video bitstream having a plurality of precincts, the method comprising:
decoding a picture header including information for defining a number of columns for dividing an image of the video bitstream into the plurality of precincts, each precinct being a unit for wavelet transform,
wherein, a width of the precinct is determined so as to be a multiple of 2 to the power of a number of horizontal wavelet decomposition levels;
decoding a precinct header for the precinct, the precinct header including information usable for determining a location, in the video bitstream, of data of the precinct which is divided by the column; and
decoding the video bitstream, based on the determined location and the number of columns.

2. The method according to claim 1, wherein the video bitstream is decoded by performing inverse transform including a filter operation.

3. The method according to claim 1, further comprising:
determining coefficients of the precinct including a set of high-frequency coefficients and a set of low-frequency coefficients, based on the determined location.

4. The method according to claim 1, wherein the data of the precinct includes a subpacket which corresponds to one precinct.

5. An apparatus for decoding a video bitstream having a plurality of precincts, the apparatus comprising:
a first decoding unit for decoding a picture header including information for defining a number of columns for dividing an image of the video bitstream into the plurality of precincts, each precinct being a unit for wavelet transform,
wherein, a width of the precinct is determined so as to be a multiple of 2 to the power of a number of horizontal wavelet decomposition levels;
a second decoding unit for decoding a precinct header for the precinct, the precinct header including information usable for determining a location, in the video bitstream, of data of the precinct which is divided by the column; and
a third decoding unit for decoding the video bitstream, based on the determined locations and the number of columns.

6. The apparatus according to claim 5, wherein the video bitstream is decoded by performing inverse transform including a filter operation.

7. The apparatus according to claim 5, further comprising:
a determination unit configured to determine coefficients of the precinct including a set of high-frequency coefficients and a set of low-frequency coefficients, based on the determined location.

8. The apparatus according to claim 5, wherein the data of the precinct includes a subpacket which corresponds to one precinct.

9. A non-transitory computer-readable storage medium which stores a program for executing a method of decoding a video bitstream having a plurality of precincts, the method comprising:
decoding a picture header including information for defining a number of columns for dividing an image of the video bitstream into the plurality of precincts, each precinct being a unit for wavelet transform,
wherein, a width of the precinct is determined so as to be a multiple of 2 to the power of a number of horizontal wavelet decomposition levels;
wherein, a plurality of precincts are included, in a horizontal direction, in a slice which extends over the width of the image, if the image is divided by the column;
decoding a precinct header for the precinct, the precinct header including information usable for determining a location, in the video bitstream, of data of the precinct which is divided by the column; and
decoding the video bitstream, based on the determined locations and the number of columns.

10. A method of encoding a video bitstream having a plurality of precincts, the method comprising:
encoding a picture header including information for defining a number of columns for dividing an image of the video bitstream into the plurality of precincts, each precinct being a unit for wavelet transform, wherein a width of the precinct is determined so as to be a multiple of 2 to the power of a number of horizontal wavelet decomposition levels;

encoding a precinct header for the precinct, the precinct header including information usable for determining a location, in the video bitstream, of data of the precinct which is divided by the column; and encoding the video bitstream, based on the determined location and the number of columns.

11. The method according to claim 10, wherein the video bitstream is encoded by performing transform including a filter operation.

12. The method according to claim 10, further comprising: determining coefficients of the precinct including a set of high-frequency coefficients and a set of low-frequency coefficients, based on the determined location.

13. The method according to claim 10, wherein the data of the precinct includes a subpacket which corresponds to one precinct.

14. An apparatus for encoding a video bitstream having a plurality of precincts, the apparatus comprising:

a first encoding unit for encoding a picture header including information for defining a number of columns for dividing an image of the video bitstream into the plurality of precincts, each precinct being a unit for wavelet transform, wherein a width of the precinct is determined so as to be a multiple of 2 to the power of a number of horizontal wavelet decomposition levels;

a second encoding unit for encoding a precinct header for the precinct, the precinct header including information usable for determining a location, in the video bitstream, of data of the precinct which is divided by the column; and a third encoding unit for encoding the video bitstream, based on the determined locations and the number of columns.

15. The apparatus according to claim 14, wherein the video bitstream is encoded by performing transform including a filter operation.

16. The apparatus according to claim 14, further comprising: a determination unit configured to determine coefficients of the precinct including a set of high-frequency coefficients and a set of low-frequency coefficients, based on the determined location.

17. The apparatus according to claim 14, wherein the data of the precinct includes a subpacket which corresponds to one precinct.

18. A non-transitory computer-readable storage medium which stores a program for executing a method of encoding a video bitstream having a plurality of precincts, the method comprising:

encoding a picture header including information for defining a number of columns for dividing an image of the video bitstream into the plurality of precincts, each precinct being a unit for wavelet transform, wherein a width of the precinct is determined so as to be a multiple of 2 to the power of a number of horizontal wavelet decomposition levels;

encoding a precinct header for the precinct, the precinct header including information usable for determining a location, in the video bitstream, of data of the precinct which is divided by the column; and encoding the video bitstream, based on the determined location and the number of columns.

\* \* \* \* \*

UNITED STATES PATENT AND TRADEMARK OFFICE
CERTIFICATE OF CORRECTION

PATENT NO. : 11,172,231 B2
APPLICATION NO. : 16/628231
DATED : November 9, 2021
INVENTOR(S) : Christopher James Rosewarne et al.

Page 1 of 1

It is certified that error appears in the above-identified patent and that said Letters Patent is hereby corrected as shown below:

In the Claims

Column 37, Line 62 in Claim 1, delete "wavelet transform" and insert --quantization--

Column 38, Line 21 in Claim 5, delete "wavelet transform" and insert --quantization--

Column 38, Line 51 in Claim 9, delete "wavelet transform" and insert --quantization--

Column 39, Line 2 in Claim 10, delete "wavelet transform" and insert --quantization--

Column 39, Line 29 in Claim 14, delete "wavelet transform" and insert --quantization--

Column 40, Line 24 in Claim 18, delete "wavelet transform" and insert --quantization--

Signed and Sealed this
Twentieth Day of January, 2026

John A. Squires
*Director of the United States Patent and Trademark Office*